United States Patent
Jhang et al.

(10) Patent No.: US 10,228,538 B2
(45) Date of Patent: Mar. 12, 2019

(54) OPTICAL IMAGING LENS

(71) Applicant: GENIUS ELECTRONIC OPTICAL CO., LTD., Taichung (TW)

(72) Inventors: Jia-Sin Jhang, Taichung (TW); Ruyou Tang, Xiamen (CN); Huifeng Pan, Xiamen (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 58 days.

(21) Appl. No.: 15/586,212

(22) Filed: May 3, 2017

(65) Prior Publication Data
US 2018/0275372 A1    Sep. 27, 2018

(30) Foreign Application Priority Data

Mar. 24, 2017 (CN) .......................... 2017 1 0182451

(51) Int. Cl.
*G02B 9/60* (2006.01)
*G02B 13/00* (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
USPC ................................................. 359/708, 714
See application file for complete search history.

(56) References Cited

U.S. PATENT DOCUMENTS

| | | | |
|---|---|---|---|
| 2004/0057124 A1* | 3/2004 | Nishina | G02B 9/34 359/771 |
| 2005/0141103 A1* | 6/2005 | Nishina | G02B 9/36 359/715 |
| 2007/0206296 A1* | 9/2007 | Itoh | G02B 13/00 359/738 |
| 2010/0110563 A1* | 5/2010 | Nakagawa | G02B 13/004 359/715 |
| 2011/0013069 A1* | 1/2011 | Chen | G02B 9/60 348/335 |
| 2011/0164327 A1* | 7/2011 | Sato | G02B 13/004 359/714 |
| 2013/0003195 A1* | 1/2013 | Kubota | G02B 13/0045 359/764 |
| 2013/0088788 A1* | 4/2013 | You | G02B 13/0045 359/714 |
| 2013/0222893 A1* | 8/2013 | Ko | G02B 9/60 359/356 |
| 2013/0258499 A1* | 10/2013 | Hashimoto | G02B 9/60 359/714 |
| 2013/0301147 A1* | 11/2013 | Yamada | G02B 13/0045 359/764 |
| 2013/0342918 A1* | 12/2013 | Kubota | G02B 13/0045 359/713 |
| 2014/0139933 A1* | 5/2014 | Chen | G02B 9/60 359/714 |
| 2014/0153115 A1* | 6/2014 | Hagiwara | G02B 13/0045 359/714 |

(Continued)

*Primary Examiner* — James Greece
(74) *Attorney, Agent, or Firm* — Baker & McKenzie LLP

(57) ABSTRACT

Present embodiments relate to an optical imaging lens. The optical imaging lens may include a first lens element, a second lens element, a third lens element, a fourth lens element, and a fifth lens element positioned sequentially from an object side to an image side. Through arrangement of convex or concave surfaces of the five lens elements, the length of the optical imaging lens may be shortened while providing improved optical characteristics and imaging quality.

20 Claims, 33 Drawing Sheets

(56) References Cited

U.S. PATENT DOCUMENTS

| | | | |
|---|---|---|---|
| 2014/0185150 A1* | 7/2014 | Shinohara | G02B 13/0045 359/713 |
| 2014/0254030 A1* | 9/2014 | Hsu | G02B 9/60 359/714 |
| 2014/0285909 A1* | 9/2014 | Teraoka | G02B 13/0045 359/764 |
| 2014/0300975 A1* | 10/2014 | Tsai | G02B 9/60 359/714 |
| 2014/0354876 A1* | 12/2014 | Shin | G02B 9/60 348/360 |
| 2015/0138651 A1* | 5/2015 | Yonezawa | G02B 3/04 359/714 |
| 2015/0146306 A1* | 5/2015 | Yonezawa | G02B 13/0045 359/714 |
| 2015/0185442 A1* | 7/2015 | Katsuragi | G02B 13/0045 348/360 |

* cited by examiner

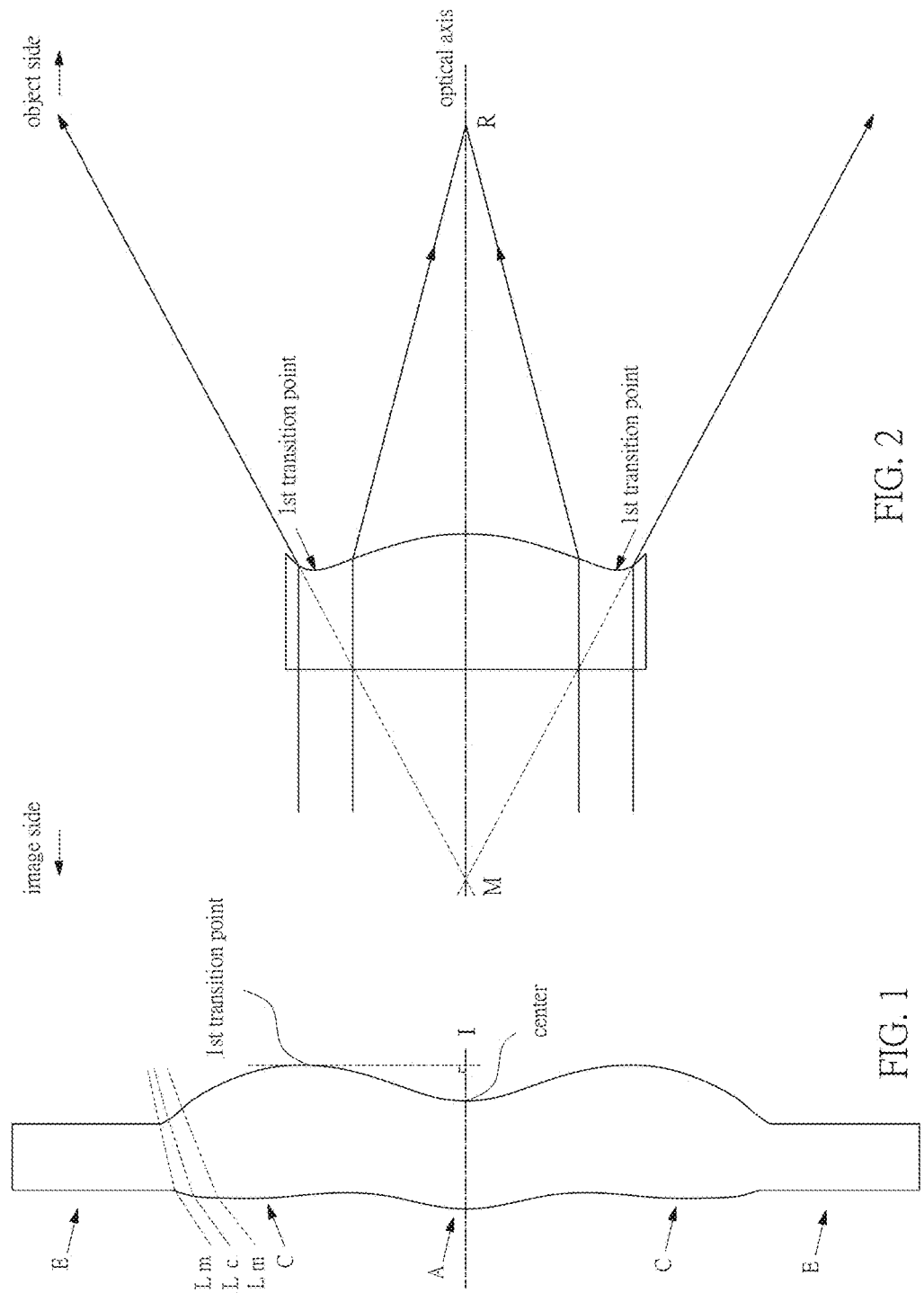

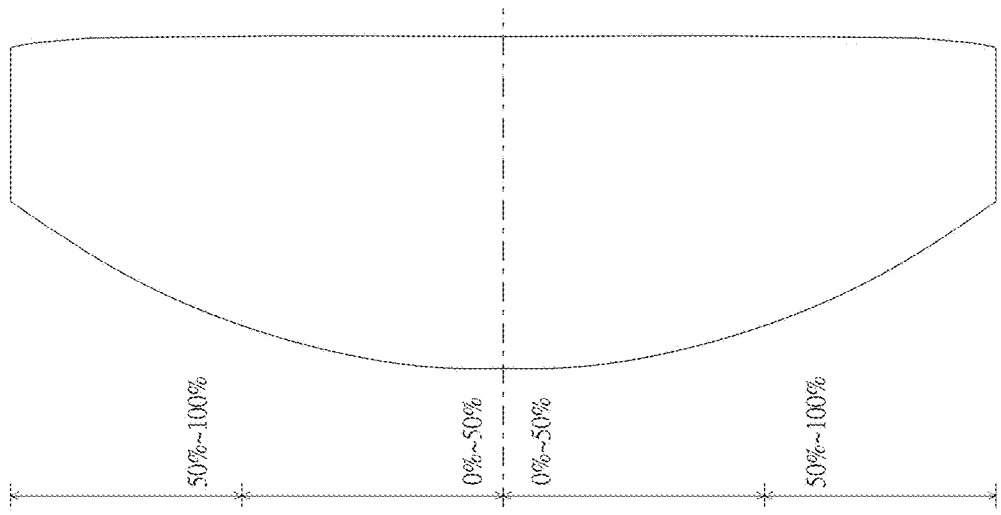
FIG. 3
FIG. 4
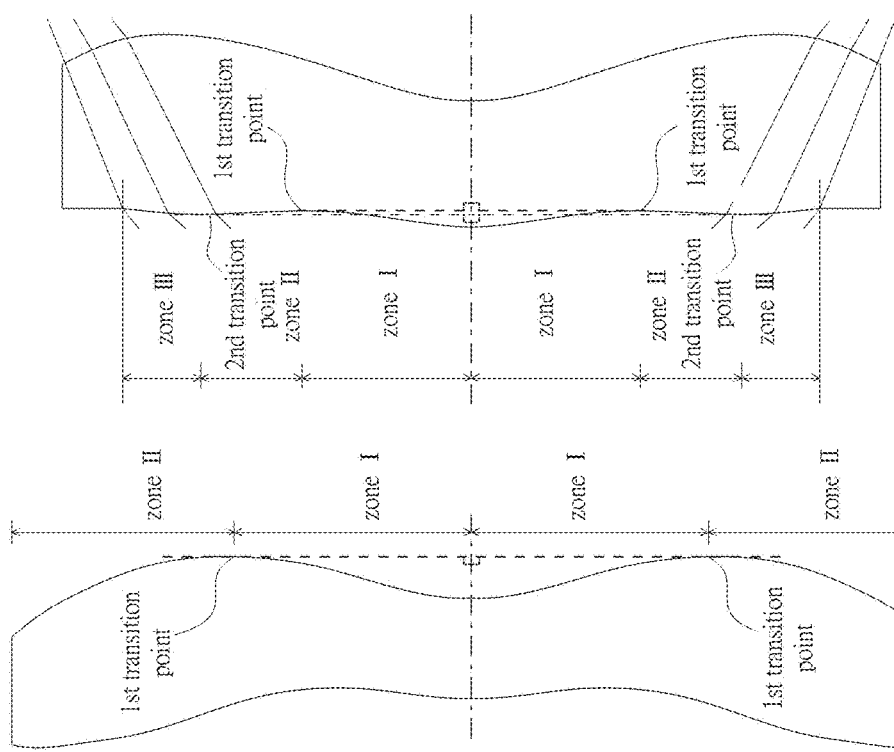
FIG. 5

| Effective focal length (EFL) = 8.651 mm, HFOV (Half field of view) = 14.900 deg., TTL = 9.147 mm, Image height = 2.586 mm, Fno = 2.390 |||||||
|---|---|---|---|---|---|---|---|
| Surface # | | Radius | Thickness / air gap | Refractive index | Abbe number | Focal length | Semi-diameter |
| - | Object | ∞ | ∞ | | | | |
| 111 | 1st lens element | 2.535 | 1.500 | 1.545 | 55.987 | 6.149 | 1.829 |
| 112 | | 8.171 | 0.047 | | | | 1.485 |
| 121 | 2nd lens element | 4.303 | 0.394 | 1.642 | 22.409 | -6.772 | 1.449 |
| 122 | | 2.093 | 0.489 | | | | 1.262 |
| 100 | Aperture stop | ∞ | -0.198 | | | | 1.244 |
| 131 | 3rd lens element | 3.134 | 1.500 | 1.535 | 55.690 | 5.704 | 1.247 |
| 132 | | -109.020 | 0.430 | | | | 1.150 |
| 141 | 4th lens element | -2.809 | 0.856 | 1.535 | 55.690 | -5.002 | 1.125 |
| 142 | | 66.452 | 0.087 | | | | 1.195 |
| 151 | 5th lens element | 9.771 | 1.500 | 1.642 | 22.409 | 17.526 | 1.202 |
| 152 | | 66.177 | 1.000 | | | | 1.540 |
| 161 | IR cut filter | ∞ | 0.210 | 1.517 | 64.167 | 0.000 | 1.959 |
| 162 | | ∞ | 1.331 | | | | 2.015 |
| 170 | Image plane | ∞ | | | | | 2.587 |

FIG. 8

| Aspherical parameters | | | | |
|---|---|---|---|---|
| Surface # | K | A2 | A4 | A6 |
| 111 | 0.000000E+00 | 0.000000E+00 | -2.449201E-03 | 2.409178E-03 |
| 112 | 0.000000E+00 | 0.000000E+00 | -2.427836E-03 | -3.763620E-03 |
| 121 | 0.000000E+00 | 0.000000E+00 | -3.039266E-02 | 3.681624E-03 |
| 122 | 0.000000E+00 | 0.000000E+00 | -5.256778E-02 | 1.082515E-02 |
| 131 | 0.000000E+00 | 0.000000E+00 | -1.917208E-02 | 4.172020E-05 |
| 132 | 0.000000E+00 | 0.000000E+00 | 1.848404E-02 | 4.822104E-03 |
| 141 | 0.000000E+00 | 0.000000E+00 | 1.058807E-01 | -5.877838E-02 |
| 142 | 0.000000E+00 | 0.000000E+00 | 2.715255E-02 | 3.754992E-02 |
| 151 | 0.000000E+00 | 0.000000E+00 | -8.253424E-02 | 9.027914E-02 |
| 152 | 0.000000E+00 | 0.000000E+00 | -8.608261E-03 | 5.638138E-03 |
| Surface # | A8 | A10 | A12 | A14 |
| 111 | -1.398496E-03 | 5.827531E-04 | -1.268337E-04 | 1.275715E-05 |
| 112 | 2.029991E-03 | 1.418443E-04 | -2.381110E-04 | 4.490069E-05 |
| 121 | -2.444998E-04 | 3.062030E-04 | 1.098051E-04 | -5.506234E-05 |
| 122 | -1.394757E-03 | 1.304906E-03 | -9.517414E-05 | 2.870810E-04 |
| 131 | -1.264306E-05 | 1.099938E-03 | 2.121499E-04 | 9.316431E-05 |
| 132 | -2.213819E-02 | 9.447247E-03 | -1.950227E-03 | 3.556029E-04 |
| 141 | 9.008983E-03 | -6.640217E-03 | 4.368574E-03 | -9.848434E-04 |
| 142 | -6.596177E-02 | 4.324224E-02 | -1.595119E-02 | 2.426135E-03 |
| 151 | -5.233904E-02 | 1.808863E-02 | -9.738126E-03 | 3.281831E-03 |
| 152 | -6.448541E-03 | 3.639197E-03 | -6.781648E-04 | 9.622415E-06 |

FIG. 9

| Effective focal length (EFL) = 9.445 mm, HFOV (Half field of view) = 14.900 deg., TTL = 8.820 mm, Image height= 2.620 mm, Fno = 2.390 ||||||||
|---|---|---|---|---|---|---|---|
| Surface # | | Radius | Thickness / air gap | Refractive index | Abbe number | Focal length | Semi-diameter |
| - | Object | ∞ | ∞ | | | | |
| 211 | 1st lens element | 2.470 | 1.237 | 1.545 | 55.987 | 5.749 | 1.870 |
| 212 | | 9.519 | 0.045 | | | | 1.716 |
| 221 | 2nd lens element | 4.779 | 0.324 | 1.642 | 22.409 | -6.498 | 1.653 |
| 222 | | 2.178 | 0.490 | | | | 1.457 |
| 200 | Aperture stop | ∞ | -0.258 | | | | 1.443 |
| 231 | 3rd lens element | 3.011 | 1.500 | 1.535 | 55.690 | 6.006 | 1.434 |
| 232 | | 37.861 | 0.411 | | | | 1.229 |
| 241 | 4th lens element | -2.818 | 0.507 | 1.535 | 55.690 | -4.452 | 1.177 |
| 242 | | 16.661 | 0.240 | | | | 1.221 |
| 251 | 5th lens element | 11.082 | 0.441 | 1.642 | 22.409 | 14.984 | 1.227 |
| 252 | | -76.571 | 1.000 | | | | 1.331 |
| 261 | IR cut filter | ∞ | 0.210 | 1.517 | 64.167 | 0.000 | 1.684 |
| 262 | | ∞ | 2.673 | | | | 1.729 |
| 270 | Image plane | ∞ | | | | | 2.622 |

FIG. 12

| Aspherical parameters | | | | |
|---|---|---|---|---|
| Surface # | K | A2 | A4 | A6 |
| 211 | 0.000000E+00 | 0.000000E+00 | -2.861889E-03 | 1.208002E-03 |
| 212 | 0.000000E+00 | 0.000000E+00 | -3.947610E-03 | -5.036755E-03 |
| 221 | 0.000000E+00 | 0.000000E+00 | -3.016596E-02 | 4.433903E-03 |
| 222 | 0.000000E+00 | 0.000000E+00 | -5.172259E-02 | 1.051623E-02 |
| 231 | 0.000000E+00 | 0.000000E+00 | -1.684293E-02 | -8.790335E-04 |
| 232 | 0.000000E+00 | 0.000000E+00 | 1.237173E-02 | 5.585007E-03 |
| 241 | 0.000000E+00 | 0.000000E+00 | 9.481389E-02 | -6.497862E-02 |
| 242 | 0.000000E+00 | 0.000000E+00 | 4.370611E-02 | 2.803103E-02 |
| 251 | 0.000000E+00 | 0.000000E+00 | -9.342591E-02 | 5.333377E-02 |
| 252 | 0.000000E+00 | 0.000000E+00 | -6.430268E-02 | 1.877569E-02 |
| Surface # | A8 | A10 | A12 | A14 |
| 211 | -1.404000E-03 | 5.734069E-04 | -1.441878E-04 | 1.254548E-05 |
| 212 | 1.208901E-03 | 2.047957E-04 | -1.071435E-04 | 1.238121E-05 |
| 221 | 2.863043E-04 | 1.847774E-04 | -6.449487E-05 | 3.303592E-06 |
| 222 | -2.174202E-03 | 9.522793E-04 | -1.631745E-04 | 2.490578E-05 |
| 231 | -1.985808E-04 | 6.712893E-04 | -6.180141E-05 | 4.934238E-05 |
| 232 | -2.289715E-02 | 9.095530E-03 | -2.497092E-03 | 5.755512E-04 |
| 241 | 5.475323E-03 | -9.713096E-03 | 4.520412E-03 | 2.638485E-04 |
| 242 | -6.943091E-02 | 4.489181E-02 | -1.552608E-02 | 2.458585E-03 |
| 251 | -4.263514E-02 | 2.166867E-02 | -9.832377E-03 | 1.510185E-03 |
| 252 | -1.046340E-02 | 2.616707E-03 | -8.452062E-04 | 1.342065E-04 |

FIG. 13

| Effective focal length (EFL) = 9.539 mm, HFOV (Half field of view) = 14.900 deg., TTL = 10.244 mm, Image height= 2.59 mm, Fno = 2.390 ||||||||
|---|---|---|---|---|---|---|---|
| Surface # | | Radius | Thickness / air gap | Refractive index | Abbe number | Focal length | Semi-diameter |
| - | Object | ∞ | ∞ | | | | |
| 311 | 1st lens element | 2.602 | 1.307 | 1.545 | 55.987 | 6.389 | 1.862 |
| 312 | | 8.410 | 0.045 | | | | 1.672 |
| 321 | 2nd lens element | 5.183 | 0.337 | 1.642 | 22.409 | -6.472 | 1.645 |
| 322 | | 2.257 | 0.458 | | | | 1.492 |
| 300 | Aperture stop | ∞ | -0.224 | | | | 1.486 |
| 331 | 3rd lens element | 3.972 | 1.327 | 1.535 | 55.690 | 5.738 | 1.488 |
| 332 | | -12.095 | 0.297 | | | | 1.311 |
| 341 | 4th lens element | -2.501 | 0.658 | 1.535 | 55.690 | -5.356 | 1.288 |
| 342 | | -21.011 | 0.083 | | | | 1.380 |
| 351 | 5th lens element | 9.481 | 1.027 | 1.642 | 22.409 | 12.046 | 1.388 |
| 352 | | -42.062 | 1.000 | | | | 1.529 |
| 361 | IR cut filter | ∞ | 0.210 | 1.517 | 64.167 | 0.000 | 1.692 |
| 362 | | ∞ | 3.720 | | | | 1.724 |
| 370 | Image plane | ∞ | | | | | 2.599 |

FIG. 16

| Aspherical parameters | | | | |
|---|---|---|---|---|
| Surface # | K | A2 | A4 | A6 |
| 311 | 0.000000E+00 | 0.000000E+00 | -3.603564E-03 | 1.666946E-03 |
| 312 | 0.000000E+00 | 0.000000E+00 | -3.277115E-03 | -5.142714E-03 |
| 321 | 0.000000E+00 | 0.000000E+00 | -2.942324E-02 | 4.833366E-03 |
| 322 | 0.000000E+00 | 0.000000E+00 | -5.308221E-02 | 8.877439E-03 |
| 331 | 0.000000E+00 | 0.000000E+00 | -1.808467E-02 | 8.845104E-04 |
| 332 | 0.000000E+00 | 0.000000E+00 | 2.700588E-02 | 4.496514E-03 |
| 341 | 0.000000E+00 | 0.000000E+00 | 1.103431E-01 | -5.523402E-02 |
| 342 | 0.000000E+00 | 0.000000E+00 | 2.414812E-02 | 3.572477E-02 |
| 351 | 0.000000E+00 | 0.000000E+00 | -6.828102E-02 | 5.540634E-02 |
| 352 | 0.000000E+00 | 0.000000E+00 | -2.722768E-02 | 7.078211E-03 |
| Surface # | A8 | A10 | A12 | A14 |
| 311 | -1.532977E-03 | 5.639615E-04 | -1.376176E-04 | 1.353713E-05 |
| 312 | 1.324609E-03 | 2.172510E-04 | -1.046985E-04 | 1.837941E-05 |
| 321 | 2.010052E-04 | 1.824592E-04 | -5.442290E-05 | 9.511482E-07 |
| 322 | -1.926058E-03 | 9.515003E-04 | -1.947174E-04 | 3.363878E-05 |
| 331 | -2.664148E-04 | 8.354974E-04 | 2.757786E-05 | 5.393721E-05 |
| 332 | -2.039515E-02 | 9.892686E-03 | -2.345256E-03 | 1.548545E-04 |
| 341 | 6.932939E-03 | -7.493022E-03 | 4.531324E-03 | -1.145209E-03 |
| 342 | -6.833298E-02 | 4.436631E-02 | -1.469893E-02 | 2.227481E-03 |
| 351 | -4.827513E-02 | 2.512640E-02 | -7.993312E-03 | 1.331165E-03 |
| 352 | -4.839438E-03 | 3.016212E-03 | -1.155436E-03 | 1.825507E-04 |

FIG. 17

| Effective focal length (EFL) = 9.741 mm, HFOV (Half field of view) = 14.900 deg., TTL = 9.728 mm, Image height= 2.687 mm, Fno = 2.390 ||||||||
|---|---|---|---|---|---|---|---|
| Surface # | | Radius | Thickness / air gap | Refractive index | Abbe number | Focal length | Semi-diameter |
| - | Object | ∞ | ∞ | | | | |
| 411 | 1st lens element | 2.592 | 1.387 | 1.545 | 55.987 | 6.130 | 2.000 |
| 412 | | 9.301 | 0.107 | | | | 1.799 |
| 421 | 2nd lens element | 4.552 | 0.470 | 1.642 | 22.409 | -6.505 | 1.696 |
| 422 | | 2.099 | 0.545 | | | | 1.442 |
| 400 | Aperture stop | ∞ | 0.003 | | | | 1.421 |
| 431 | 3rd lens element | 4.125 | 0.558 | 1.535 | 55.690 | 5.952 | 1.385 |
| 432 | | -13.481 | 0.501 | | | | 1.355 |
| 441 | 4th lens element | -2.899 | 0.530 | 1.535 | 55.690 | -4.856 | 1.290 |
| 442 | | 27.355 | 0.207 | | | | 1.335 |
| 451 | 5th lens element | 4.705 | 1.500 | 1.642 | 22.409 | 12.466 | 1.351 |
| 452 | | 9.872 | 1.000 | | | | 1.508 |
| 461 | IR cut filter | ∞ | 0.210 | 1.517 | 64.167 | 0.000 | 1.822 |
| 462 | | ∞ | 2.710 | | | | 1.863 |
| 470 | Image plane | ∞ | | | | | 2.692 |

FIG. 20

| Aspherical parameters | | | | |
|---|---|---|---|---|
| Surface # | K | A2 | A4 | A6 |
| 411 | 0.000000E+00 | 0.000000E+00 | -2.648378E-03 | 1.171059E-03 |
| 412 | 0.000000E+00 | 0.000000E+00 | -3.266331E-03 | -5.100525E-03 |
| 421 | 0.000000E+00 | 0.000000E+00 | -2.983641E-02 | 4.542189E-03 |
| 422 | 0.000000E+00 | 0.000000E+00 | -5.300492E-02 | 1.083730E-02 |
| 431 | 0.000000E+00 | 0.000000E+00 | -2.006350E-02 | -1.037107E-03 |
| 432 | 0.000000E+00 | 0.000000E+00 | 1.445210E-02 | 6.202585E-03 |
| 441 | 0.000000E+00 | 0.000000E+00 | 1.168213E-01 | -5.891242E-02 |
| 442 | 0.000000E+00 | 0.000000E+00 | 2.046090E-02 | 3.573140E-02 |
| 451 | 0.000000E+00 | 0.000000E+00 | -6.815262E-02 | 5.368926E-02 |
| 452 | 0.000000E+00 | 0.000000E+00 | -2.422751E-02 | 9.347689E-03 |
| Surface # | A8 | A10 | A12 | A14 |
| 411 | -1.476898E-03 | 5.817879E-04 | -1.377446E-04 | 1.232328E-05 |
| 412 | 1.174022E-03 | 1.943179E-04 | -1.057687E-04 | 1.453182E-05 |
| 421 | 2.801744E-04 | 1.795736E-04 | -6.346670E-05 | 2.722879E-06 |
| 422 | -1.720002E-03 | 9.101934E-04 | -2.203782E-04 | 1.684647E-05 |
| 431 | -8.103763E-04 | 9.904963E-04 | 1.442595E-04 | 8.709817E-05 |
| 432 | -2.082608E-02 | 9.873598E-03 | -1.930496E-03 | 2.522052E-04 |
| 441 | 6.866799E-03 | -6.799440E-03 | 4.653938E-03 | -1.294985E-03 |
| 442 | -6.691321E-02 | 4.401907E-02 | -1.501136E-02 | 2.161614E-03 |
| 451 | -4.387095E-02 | 2.602351E-02 | -8.837922E-03 | 1.264145E-03 |
| 452 | -5.985303E-03 | 3.166400E-03 | -9.056096E-04 | 1.054111E-04 |

FIG. 21

| Effective focal length (EFL) = 9.528 mm, HFOV (Half field of view) = 14.900 deg., TTL = 9.439 mm, Image height= 2.619 mm, Fno = 2.390 ||||||||
|---|---|---|---|---|---|---|---|
| Surface # | | Radius | Thickness / air gap | Refractive index | Abbe number | Focal length | Semi-diameter |
| - | Object | ∞ | ∞ | | | | |
| 511 | 1st lens element | 2.619 | 1.284 | 1.545 | 55.987 | 6.283 | 1.898 |
| 512 | | 9.131 | 0.094 | | | | 1.730 |
| 521 | 2nd lens element | 4.401 | 0.300 | 1.642 | 22.409 | -6.781 | 1.652 |
| 522 | | 2.139 | 0.476 | | | | 1.479 |
| 500 | Aperture stop | ∞ | -0.224 | | | | 1.471 |
| 531 | 3rd lens element | 3.003 | 1.444 | 1.535 | 55.690 | 5.791 | 1.458 |
| 532 | | 73.969 | 0.397 | | | | 1.279 |
| 541 | 4th lens element | -2.755 | 0.516 | 1.535 | 55.690 | -4.632 | 1.234 |
| 542 | | 27.037 | 0.121 | | | | 1.274 |
| 551 | 5th lens element | 6.233 | 1.454 | 1.642 | 22.409 | 14.248 | 1.290 |
| 552 | | 17.466 | 1.000 | | | | 1.481 |
| 561 | IR cut filter | ∞ | 0.210 | 1.517 | 64.167 | 0.000 | 1.806 |
| 562 | | ∞ | 2.368 | | | | 1.850 |
| 570 | Image plane | ∞ | | | | | 2.620 |

FIG. 24

| Aspherical parameters | | | | |
|---|---|---|---|---|
| Surface # | K | A2 | A4 | A6 |
| 511 | 0.000000E+00 | 0.000000E+00 | -3.329467E-03 | 1.186911E-03 |
| 512 | 0.000000E+00 | 0.000000E+00 | -3.589850E-03 | -5.204156E-03 |
| 521 | 0.000000E+00 | 0.000000E+00 | -3.023291E-02 | 4.363906E-03 |
| 522 | 0.000000E+00 | 0.000000E+00 | -5.424272E-02 | 1.017366E-02 |
| 531 | 0.000000E+00 | 0.000000E+00 | -1.904569E-02 | -3.550870E-04 |
| 532 | 0.000000E+00 | 0.000000E+00 | 1.353742E-02 | 5.854820E-03 |
| 541 | 0.000000E+00 | 0.000000E+00 | 1.119361E-01 | -6.241894E-02 |
| 542 | 0.000000E+00 | 0.000000E+00 | 3.380643E-02 | 3.582674E-02 |
| 551 | 0.000000E+00 | 0.000000E+00 | -6.439263E-02 | 5.557160E-02 |
| 552 | 0.000000E+00 | 0.000000E+00 | -2.113606E-02 | 8.163596E-03 |
| Surface # | A8 | A10 | A12 | A14 |
| 511 | -1.408647E-03 | 5.672101E-04 | -1.405838E-04 | 1.333164E-05 |
| 512 | 1.170742E-03 | 2.031491E-04 | -1.063093E-04 | 1.463229E-05 |
| 521 | 2.701956E-04 | 1.722722E-04 | -5.714119E-05 | 3.744371E-06 |
| 522 | -2.215730E-03 | 9.977613E-04 | -1.786808E-04 | 2.284842E-05 |
| 531 | -2.759636E-04 | 6.897346E-04 | -2.156110E-05 | 3.587830E-05 |
| 532 | -2.091597E-02 | 9.147682E-03 | -2.570720E-03 | 5.655240E-04 |
| 541 | 6.417987E-03 | -7.427092E-03 | 4.086856E-03 | -4.097857E-04 |
| 542 | -7.086443E-02 | 4.424850E-02 | -1.408188E-02 | 2.312495E-03 |
| 551 | -4.602912E-02 | 2.482559E-02 | -8.424003E-03 | 1.557126E-03 |
| 552 | -5.651538E-03 | 2.978968E-03 | -8.572390E-04 | 1.017882E-04 |

FIG. 25

| Effective focal length (EFL) = 9.381 mm, HFOV (Half field of view) = 14.900 deg., TTL = 9.046 mm, Image height = 2.618 mm, Fno = 2.390 |||||||
|---|---|---|---|---|---|---|
| Surface # | | Radius | Thickness / air gap | Refractive index | Abbe number | Focal length | Semi-diameter |
| - | Object | ∞ | ∞ | | | | |
| 611 | 1st lens element | 2.501 | 1.266 | 1.545 | 55.987 | 6.094 | 1.889 |
| 612 | | 8.257 | 0.050 | | | | 1.715 |
| 621 | 2nd lens element | 4.123 | 0.366 | 1.642 | 22.409 | -6.464 | 1.647 |
| 622 | | 2.004 | 0.509 | | | | 1.426 |
| 600 | Aperture stop | ∞ | -0.166 | | | | 1.418 |
| 631 | 3rd lens element | 2.963 | 1.441 | 1.535 | 55.690 | 5.484 | 1.398 |
| 632 | | -353.808 | 0.373 | | | | 1.244 |
| 641 | 4th lens element | -2.602 | 0.730 | 1.535 | 55.690 | -4.311 | 1.214 |
| 642 | | 22.899 | 0.285 | | | | 1.299 |
| 651 | 5th lens element | 4.102 | 0.308 | 1.642 | 22.409 | 12.668 | 1.356 |
| 652 | | 7.966 | 1.000 | | | | 1.383 |
| 661 | IR cut filter | ∞ | 0.210 | 1.517 | 64.167 | 0.000 | 1.702 |
| 662 | | ∞ | 2.673 | | | | 1.745 |
| 670 | Image plane | ∞ | | | | | 2.619 |

FIG. 28

| Aspherical parameters | | | | |
|---|---|---|---|---|
| Surface # | K | A2 | A4 | A6 |
| 611 | 0.000000E+00 | 0.000000E+00 | -2.836923E-03 | 1.310748E-03 |
| 612 | 0.000000E+00 | 0.000000E+00 | -3.473218E-03 | -4.914299E-03 |
| 621 | 0.000000E+00 | 0.000000E+00 | -2.983856E-02 | 4.229730E-03 |
| 622 | 0.000000E+00 | 0.000000E+00 | -5.314295E-02 | 1.088916E-02 |
| 631 | 0.000000E+00 | 0.000000E+00 | -1.727031E-02 | 3.324677E-04 |
| 632 | 0.000000E+00 | 0.000000E+00 | 1.584184E-02 | 5.169311E-03 |
| 641 | 0.000000E+00 | 0.000000E+00 | 8.679983E-02 | -5.091840E-02 |
| 642 | 0.000000E+00 | 0.000000E+00 | 2.602058E-02 | 3.335004E-02 |
| 651 | 0.000000E+00 | 0.000000E+00 | -9.057403E-02 | 5.736222E-02 |
| 652 | 0.000000E+00 | 0.000000E+00 | -6.433588E-02 | 2.124681E-02 |
| Surface # | A8 | A10 | A12 | A14 |
| 611 | -1.433537E-03 | 5.801589E-04 | -1.399583E-04 | 1.227121E-05 |
| 612 | 1.195873E-03 | 1.973194E-04 | -1.059268E-04 | 1.332784E-05 |
| 621 | 2.889312E-04 | 1.952284E-04 | -5.905810E-05 | 3.611467E-06 |
| 622 | -2.087377E-03 | 9.328755E-04 | -1.580302E-04 | 4.103500E-05 |
| 631 | -1.603694E-04 | 6.708614E-04 | -3.697379E-05 | 6.516069E-05 |
| 632 | -2.069603E-02 | 9.758629E-03 | -2.692092E-03 | 3.568951E-04 |
| 641 | 7.181676E-03 | -8.689152E-03 | 4.581276E-03 | -8.660553E-04 |
| 642 | -6.528629E-02 | 4.471933E-02 | -1.533657E-02 | 2.284342E-03 |
| 651 | -4.420016E-02 | 2.485255E-02 | -8.646432E-03 | 1.452793E-03 |
| 652 | -7.601875E-03 | 2.294749E-03 | -8.240727E-04 | 2.327430E-04 |

FIG. 29

| Effective focal length (EFL) = 9.081 mm, HFOV (Half field of view) = 14.900 deg., TTL = 9.739 mm, Image height= 2.443 mm, Fno = 2.390 |||||||
|---|---|---|---|---|---|---|---|
| Surface # | | Radius | Thickness / air gap | Refractive index | Abbe number | Focal length | Semi-diameter |
| - | Object | ∞ | ∞ | | | | |
| 711 | 1st lens element | 2.599 | 1.080 | 1.545 | 55.987 | 5.960 | 1.846 |
| 712 | | 10.995 | 0.050 | | | | 1.694 |
| 721 | 2nd lens element | 3.122 | 0.392 | 1.642 | 22.409 | -7.822 | 1.606 |
| 722 | | 1.836 | 0.642 | | | | 1.383 |
| 700 | Aperture stop | ∞ | 0.867 | | | | 1.360 |
| 731 | 3rd lens element | 4.315 | 1.405 | 1.535 | 55.690 | 7.009 | 1.420 |
| 732 | | -25.961 | 0.157 | | | | 1.411 |
| 741 | 4th lens element | -3.166 | 0.602 | 1.535 | 55.690 | -4.594 | 1.392 |
| 742 | | 11.865 | 0.130 | | | | 1.408 |
| 751 | 5th lens element | 4.759 | 1.007 | 1.642 | 22.409 | 9.687 | 1.408 |
| 752 | | 18.099 | 1.000 | | | | 1.561 |
| 761 | IR cut filter | ∞ | 0.210 | 1.517 | 64.167 | 0.000 | 1.836 |
| 762 | | ∞ | 2.197 | | | | 1.872 |
| 770 | Image plane | ∞ | | | | | 2.450 |

FIG. 32

| Aspherical parameters | | | | |
|---|---|---|---|---|
| Surface # | K | A2 | A4 | A6 |
| 711 | 0.000000E+00 | 0.000000E+00 | 3.292155E-04 | 1.668372E-03 |
| 712 | 0.000000E+00 | 0.000000E+00 | 7.249453E-03 | -4.521163E-03 |
| 721 | 0.000000E+00 | 0.000000E+00 | -3.005323E-02 | 4.339539E-03 |
| 722 | 0.000000E+00 | 0.000000E+00 | -5.158147E-02 | 1.369031E-02 |
| 731 | 0.000000E+00 | 0.000000E+00 | -1.438634E-02 | 4.925016E-04 |
| 732 | 0.000000E+00 | 0.000000E+00 | -1.014753E-03 | 1.740387E-03 |
| 741 | 0.000000E+00 | 0.000000E+00 | 1.138604E-01 | -6.308197E-02 |
| 742 | 0.000000E+00 | 0.000000E+00 | 2.873487E-02 | 3.595171E-02 |
| 751 | 0.000000E+00 | 0.000000E+00 | -8.089178E-02 | 6.143423E-02 |
| 752 | 0.000000E+00 | 0.000000E+00 | -3.702601E-02 | 1.461516E-02 |
| Surface # | A8 | A10 | A12 | A14 |
| 711 | -1.445261E-03 | 5.738920E-04 | -1.262066E-04 | 1.244097E-05 |
| 712 | 9.745347E-04 | 1.906582E-04 | -8.707534E-05 | 9.098856E-06 |
| 721 | 3.056164E-04 | 1.777806E-04 | -9.481915E-05 | 4.636577E-06 |
| 722 | -3.822101E-03 | 1.166947E-03 | -1.923568E-04 | -5.197667E-05 |
| 731 | -1.398452E-05 | 2.583277E-04 | -1.867320E-05 | -3.569945E-05 |
| 732 | -2.486882E-02 | 1.005863E-02 | -8.548133E-04 | -4.678020E-05 |
| 741 | 7.230206E-03 | -6.495608E-03 | 4.362991E-03 | -6.108697E-04 |
| 742 | -6.289321E-02 | 4.217957E-02 | -1.494245E-02 | 2.016677E-03 |
| 751 | -4.709078E-02 | 2.681861E-02 | -8.952179E-03 | 1.069752E-03 |
| 752 | -6.943340E-03 | 3.055123E-03 | -8.370961E-04 | 1.003259E-04 |

FIG. 33

| Effective focal length (EFL) = 9.713 mm, HPOV (Half field of view) = 14.900 deg., TTL = 9.818 mm, Image height= 2.717 mm, Fno = 2.390 |||||||
|---|---|---|---|---|---|---|
| Surface # | | Radius | Thickness / air gap | Refractive index | Abbe number | Focal length | Semi-diameter |
| - | Object | ∞ | ∞ | | | | |
| 811 | 1st lens element | 2.897 | 1.154 | 1.545 | 55.987 | 6.891 | 1.990 |
| 812 | | 10.799 | 0.345 | | | | 1.895 |
| 821 | 2nd lens element | 4.251 | 0.447 | 1.642 | 22.409 | -7.045 | 1.683 |
| 822 | | 2.109 | 0.766 | | | | 1.476 |
| 800 | Aperture stop | ∞ | 0.182 | | | | 1.430 |
| 831 | 3rd lens element | 2.562 | 1.201 | 1.535 | 55.690 | 5.219 | 1.477 |
| 832 | | 25.199 | 0.548 | | | | 1.350 |
| 841 | 4th lens element | -2.641 | 0.300 | 1.535 | 55.690 | -4.461 | 1.291 |
| 842 | | 26.539 | 0.262 | | | | 1.325 |
| 851 | 5th lens element | 8.339 | 1.360 | 1.642 | 22.409 | 15.854 | 1.361 |
| 852 | | 41.635 | 1.000 | | | | 1.559 |
| 861 | IR cut filter | ∞ | 0.210 | 1.517 | 64.167 | 0.000 | 1.927 |
| 862 | | ∞ | 2.042 | | | | 1.975 |
| 870 | Image plane | ∞ | | | | | 2.719 |

FIG. 36

| Aspherical parameters | | | | |
|---|---|---|---|---|
| Surface # | K | A2 | A4 | A6 |
| 811 | 0.000000E+00 | 0.000000E+00 | -1.773594E-03 | 1.985025E-04 |
| 812 | 0.000000E+00 | 0.000000E+00 | -1.175437E-05 | -2.714579E-03 |
| 821 | 0.000000E+00 | 0.000000E+00 | -2.799992E-02 | 4.252651E-03 |
| 822 | 0.000000E+00 | 0.000000E+00 | -5.174245E-02 | 1.095359E-02 |
| 831 | 0.000000E+00 | 0.000000E+00 | -1.469257E-02 | 1.070476E-03 |
| 832 | 0.000000E+00 | 0.000000E+00 | -9.947384E-04 | 6.689518E-03 |
| 841 | 0.000000E+00 | 0.000000E+00 | 1.149650E-01 | -5.023149E-02 |
| 842 | 0.000000E+00 | 0.000000E+00 | 5.156461E-02 | 1.876473E-02 |
| 851 | 0.000000E+00 | 0.000000E+00 | -6.193282E-02 | 5.272302E-02 |
| 852 | 0.000000E+00 | 0.000000E+00 | -1.742419E-02 | 6.246950E-03 |
| Surface # | A8 | A10 | A12 | A14 |
| 811 | -5.188709E-04 | 1.489241E-04 | -3.215604E-05 | 2.450629E-06 |
| 812 | 2.397330E-04 | 8.892818E-05 | -2.568500E-05 | 2.192445E-06 |
| 821 | 7.918126E-05 | 1.185959E-04 | -6.247069E-05 | 7.756795E-06 |
| 822 | -2.577528E-03 | 1.347729E-03 | -5.025709E-04 | 6.026789E-05 |
| 831 | -5.285318E-05 | 5.440109E-04 | -2.229413E-04 | 3.667864E-05 |
| 832 | -1.217087E-02 | 8.800368E-03 | -3.543792E-03 | 5.909231E-04 |
| 841 | -1.432640E-02 | 2.252137E-02 | -1.121737E-02 | 2.110443E-03 |
| 842 | -5.727777E-02 | 4.138465E-02 | -1.439484E-02 | 2.041178E-03 |
| 851 | -3.948727E-02 | 2.320232E-02 | -7.558307E-03 | 1.003775E-03 |
| 852 | -1.569707E-03 | 2.473397E-04 | 7.042959E-05 | -2.064820E-05 |

FIG. 37

| Effective focal length (EFL) = 9.790 mm, HFOV (Half field of view) = 14.900 deg., TTL = 9.550 mm, Image height= 2.608 mm, Fno = 2.390 |||||||
|---|---|---|---|---|---|---|---|
| Surface # | | Radius | Thickness / air gap | Refractive index | Abbe number | Focal length | Semi-diameter |
| - | Object | ∞ | ∞ | | | | |
| 911 | 1st lens element | 2.504 | 1.351 | 1.545 | 55.987 | 6.153 | 1.922 |
| 912 | | 7.949 | 0.045 | | | | 1.724 |
| 921 | 2nd lens element | 4.110 | 0.350 | 1.642 | 22.409 | -6.758 | 1.665 |
| 922 | | 2.048 | 0.558 | | | | 1.470 |
| 900 | Aperture stop | ∞ | -0.228 | | | | 1.455 |
| 931 | 3rd lens element | 3.529 | 1.318 | 1.535 | 55.690 | 5.802 | 1.456 |
| 932 | | -22.950 | 0.403 | | | | 1.297 |
| 941 | 4th lens element | -2.705 | 0.657 | 1.535 | 55.690 | -5.044 | 1.234 |
| 942 | | -10000.000 | 0.140 | | | | 1.308 |
| 951 | 5th lens element | 10.084 | 1.003 | 1.617 | 30.973 | 18.985 | 1.314 |
| 952 | | 67.635 | 1.000 | | | | 1.466 |
| 961 | IR cut filter | ∞ | 0.210 | 1.517 | 64.167 | 0.000 | 1.777 |
| 962 | | ∞ | 2.743 | | | | 1.816 |
| 970 | Image plane | ∞ | | | | | 2.610 |

FIG. 40

| Aspherical parameters | | | | |
|---|---|---|---|---|
| Surface # | K | A2 | A4 | A6 |
| 911 | 0.000000E+00 | 0.000000E+00 | -3.799768E-03 | 1.391371E-03 |
| 912 | 0.000000E+00 | 0.000000E+00 | -3.373399E-03 | -4.991396E-03 |
| 921 | 0.000000E+00 | 0.000000E+00 | -2.961269E-02 | 4.457152E-03 |
| 922 | 0.000000E+00 | 0.000000E+00 | -5.435858E-02 | 9.956453E-03 |
| 931 | 0.000000E+00 | 0.000000E+00 | -1.813669E-02 | -2.852548E-04 |
| 932 | 0.000000E+00 | 0.000000E+00 | 1.559912E-02 | 5.634677E-03 |
| 941 | 0.000000E+00 | 0.000000E+00 | 1.080161E-01 | -6.200744E-02 |
| 942 | 0.000000E+00 | 0.000000E+00 | 2.557282E-02 | 3.657476E-02 |
| 951 | 0.000000E+00 | 0.000000E+00 | -8.024403E-02 | 5.354110E-02 |
| 952 | 0.000000E+00 | 0.000000E+00 | -4.029876E-02 | 1.222024E-02 |
| Surface # | A8 | A10 | A12 | A14 |
| 911 | -1.482487E-03 | 5.723989E-04 | -1.388491E-04 | 1.296739E-05 |
| 912 | 1.217165E-03 | 1.969774E-04 | -1.051063E-04 | 1.507796E-05 |
| 921 | 2.416482E-04 | 1.819037E-03 | -6.254354E-05 | 1.727796E-06 |
| 922 | -2.085978E-03 | 8.721886E-04 | -1.923283E-04 | 3.665840E-05 |
| 931 | -2.775441E-04 | 8.282733E-04 | -4.846224E-06 | 5.315479E-05 |
| 932 | -2.139669E-02 | 9.860288E-03 | -1.984238E-03 | 1.910968E-04 |
| 941 | 7.495937E-03 | -7.384361E-03 | 4.135346E-03 | -9.153816E-04 |
| 942 | -7.030468E-02 | 4.405204E-02 | -1.444520E-02 | 2.173582E-03 |
| 951 | -4.536887E-02 | 2.520009E-02 | -8.542216E-03 | 1.413616E-03 |
| 952 | -6.679127E-03 | 3.139570E-03 | -8.488430E-04 | 9.903026E-05 |

FIG. 41

| Effective focal length (EFL) = 9.729 mm, HFOV (Half field of view) = 14.900 deg. , TTL = 9.564 mm, Image height = 2.618 mm, Fno = 2.500 |||||||
|---|---|---|---|---|---|---|---|
| Surface # | | Radius | Thickness / air gap | Refractive index | Abbe number | Focal length | Semi-diameter |
| - | Object | ∞ | ∞ | | | | |
| 10'11 | 1st lens element | 2.506 | 1.345 | 1.545 | 55.987 | 6.153 | 1.756 |
| 10'12 | | 7.984 | 0.159 | | | | 1.546 |
| 10'00 | Aperture stop | ∞ | -0.110 | | | | 1.526 |
| 10'21 | 2nd lens element | 4.092 | 0.345 | 1.642 | 22.409 | -6.755 | 1.496 |
| 10'22 | | 2.044 | 0.325 | | | | 1.362 |
| 10'31 | 3rd lens element | 3.525 | 1.317 | 1.535 | 55.690 | 5.797 | 1.371 |
| 10'32 | | -23.003 | 0.406 | | | | 1.268 |
| 10'41 | 4th lens element | -2.701 | 0.658 | 1.535 | 55.690 | -5.026 | 1.217 |
| 10'42 | | 1716.255 | 0.147 | | | | 1.292 |
| 10'51 | 5th lens element | 10.100 | 0.973 | 1.642 | 22.409 | 18.237 | 1.299 |
| 10'52 | | 67.266 | 1.000 | | | | 1.531 |
| 10'61 | IR cut filter | ∞ | 0.210 | 1.517 | 64.167 | 0.000 | 1.834 |
| 10'62 | | ∞ | 2.789 | | | | 1.871 |
| 10'70 | Image plane | ∞ | | | | | 2.620 |

FIG. 44

| Aspherical parameters | | | | |
|---|---|---|---|---|
| Surface # | K | A2 | A4 | A6 |
| 10'11 | 0.000000E+00 | 0.000000E+00 | -3.784713E-03 | 1.390436E-03 |
| 10'12 | 0.000000E+00 | 0.000000E+00 | -3.387378E-03 | -4.998243E-03 |
| 10'21 | 0.000000E+00 | 0.000000E+00 | -2.963102E-02 | 4.450376E-03 |
| 10'22 | 0.000000E+00 | 0.000000E+00 | -5.428835E-02 | 9.977405E-03 |
| 10'31 | 0.000000E+00 | 0.000000E+00 | -1.827677E-02 | -2.956926E-04 |
| 10'32 | 0.000000E+00 | 0.000000E+00 | 1.564594E-02 | 5.469549E-03 |
| 10'41 | 0.000000E+00 | 0.000000E+00 | 1.079722E-01 | -6.183803E-02 |
| 10'42 | 0.000000E+00 | 0.000000E+00 | 2.571470E-02 | 3.654488E-02 |
| 10'51 | 0.000000E+00 | 0.000000E+00 | -8.013578E-02 | 5.377373E-02 |
| 10'52 | 0.000000E+00 | 0.000000E+00 | -4.005719E-02 | 1.217164E-02 |
| Surface # | A8 | A10 | A12 | A14 |
| 10'11 | -1.480046E-03 | 5.729246E-04 | -1.387998E-04 | 1.298910E-05 |
| 10'12 | 1.214059E-03 | 1.965303E-04 | -1.052178E-04 | 1.496010E-05 |
| 10'21 | 2.424881E-04 | 1.811407E-04 | -6.288802E-05 | 1.668103E-06 |
| 10'22 | -2.079248E-03 | 8.798887E-04 | -1.882936E-04 | 3.788911E-05 |
| 10'31 | -2.806145E-04 | 8.209764E-04 | -7.227356E-06 | 5.314685E-05 |
| 10'32 | -2.147744E-02 | 9.836243E-03 | -2.005149E-03 | 1.674863E-04 |
| 10'41 | 7.475000E-03 | -7.456380E-03 | 4.098531E-03 | -9.215445E-04 |
| 10'42 | -7.029757E-02 | 4.406106E-02 | -1.444666E-02 | 2.168713E-03 |
| 10'51 | -4.534446E-02 | 2.517007E-02 | -8.559447E-03 | 1.418951E-03 |
| 10'52 | -6.673693E-03 | 3.155565E-03 | -8.440953E-04 | 9.567872E-05 |

FIG. 45

| Embodiment | 1st | 2nd | 3rd | 4th | 5th | 6th | 7th | 8th | 9th | 10th |
|---|---|---|---|---|---|---|---|---|---|---|
| T1 | 1.500 | 1.237 | 1.307 | 1.387 | 1.284 | 1.266 | 1.080 | 1.154 | 1.351 | 1.345 |
| G12 | 0.047 | 0.045 | 0.045 | 0.107 | 0.094 | 0.050 | 0.050 | 0.345 | 0.045 | 0.050 |
| T2 | 0.394 | 0.324 | 0.337 | 0.470 | 0.300 | 0.366 | 0.392 | 0.447 | 0.350 | 0.345 |
| G23 | 0.291 | 0.232 | 0.233 | 0.548 | 0.252 | 0.343 | 1.509 | 0.948 | 0.330 | 0.325 |
| T3 | 1.500 | 1.500 | 1.327 | 0.558 | 1.444 | 1.441 | 1.405 | 1.201 | 1.318 | 1.317 |
| G34 | 0.430 | 0.411 | 0.297 | 0.501 | 0.397 | 0.373 | 0.157 | 0.548 | 0.403 | 0.406 |
| T4 | 0.856 | 0.507 | 0.658 | 0.530 | 0.516 | 0.730 | 0.602 | 0.300 | 0.657 | 0.658 |
| G45 | 0.087 | 0.240 | 0.083 | 0.207 | 0.121 | 0.285 | 0.130 | 0.262 | 0.140 | 0.147 |
| T5 | 1.500 | 0.441 | 1.027 | 1.500 | 1.454 | 0.308 | 1.007 | 1.360 | 1.003 | 0.973 |
| G5 | 1.000 | 1.000 | 1.000 | 1.000 | 1.000 | 1.000 | 1.000 | 1.000 | 1.000 | 1.000 |
| TF | 0.210 | 0.210 | 0.210 | 0.210 | 0.210 | 0.210 | 0.210 | 0.210 | 0.210 | 0.210 |
| GFP | 1.331 | 2.673 | 3.720 | 2.710 | 2.368 | 2.673 | 2.197 | 2.042 | 2.743 | 2.789 |
| BFL | 2.541 | 3.883 | 4.930 | 3.920 | 3.578 | 3.883 | 3.407 | 3.252 | 3.953 | 3.999 |
| ALT | 5.750 | 4.009 | 4.656 | 4.445 | 4.998 | 4.112 | 4.487 | 4.463 | 4.679 | 4.637 |
| AAG | 0.856 | 0.928 | 0.658 | 1.363 | 0.863 | 1.051 | 1.845 | 2.103 | 0.917 | 0.928 |
| TTL | 9.147 | 8.820 | 10.244 | 9.728 | 9.439 | 9.046 | 9.739 | 9.818 | 9.550 | 9.564 |
| TL | 6.606 | 4.937 | 5.314 | 5.808 | 5.861 | 5.163 | 6.331 | 6.566 | 5.596 | 5.565 |
| EFL/ALT | 1.504 | 2.356 | 2.049 | 2.191 | 1.906 | 2.282 | 2.024 | 2.176 | 2.092 | 2.098 |
| EFL/BFL | 3.405 | 2.432 | 1.935 | 2.485 | 2.663 | 2.416 | 2.665 | 2.987 | 2.476 | 2.433 |
| TTL/BFL | 3.600 | 2.271 | 2.078 | 2.482 | 2.638 | 2.330 | 2.858 | 3.019 | 2.416 | 2.392 |
| TTL/ALT | 1.591 | 2.200 | 2.200 | 2.189 | 1.888 | 2.200 | 2.171 | 2.200 | 2.041 | 2.063 |
| ALT/(T1+T3+T4) | 1.491 | 1.236 | 1.414 | 1.796 | 1.541 | 1.196 | 1.453 | 1.681 | 1.407 | 1.397 |
| (T2+G23+G34+G45+T5)/T1 | 1.802 | 1.333 | 1.513 | 2.327 | 1.965 | 1.323 | 2.958 | 3.088 | 1.648 | 1.632 |
| (T2+G23+G34+G45+T5)/T3 | 1.802 | 1.099 | 1.490 | 5.787 | 1.747 | 1.163 | 2.273 | 2.968 | 1.688 | 1.667 |
| (G12+T2+G45+T5)/T1 | 1.353 | 0.849 | 1.141 | 1.647 | 1.533 | 0.796 | 1.462 | 2.092 | 1.138 | 1.126 |
| (G12+T2+G45+T5)/T3 | 1.353 | 0.700 | 1.124 | 4.097 | 1.363 | 0.700 | 1.124 | 2.010 | 1.166 | 1.149 |
| (AAG+T5)/T1 | 1.571 | 1.107 | 1.289 | 2.065 | 1.804 | 1.074 | 2.641 | 3.000 | 1.422 | 1.413 |
| (AAG+T5)/(T2+G23) | 3.436 | 2.461 | 2.952 | 2.810 | 4.198 | 1.918 | 1.500 | 2.482 | 2.823 | 2.836 |
| (AAG+T2)/T4 | 1.461 | 2.468 | 1.513 | 3.460 | 2.252 | 1.940 | 3.716 | 8.503 | 1.929 | 1.934 |
| (AAG+T2)/T5 | 0.833 | 2.840 | 0.969 | 1.222 | 0.800 | 4.595 | 2.222 | 1.875 | 1.265 | 1.309 |
| AAG/T2 | 2.170 | 2.861 | 1.950 | 2.897 | 2.877 | 2.876 | 4.700 | 4.701 | 2.619 | 2.693 |
| AAG/G23 | 2.938 | 4.000 | 2.818 | 2.485 | 3.427 | 3.062 | 1.223 | 2.218 | 2.782 | 2.851 |
| AAG/T4 | 1.000 | 1.829 | 1.000 | 2.572 | 1.671 | 1.439 | 3.064 | 7.011 | 1.396 | 1.410 |

FIG. 46

OPTICAL IMAGING LENS

CROSS REFERENCE TO RELATED APPLICATION

This application claims priority to P.R.C. Patent Application No. 201710182451.5 titled "Optical Imaging Lens", filed Mar. 24, 2017, with the State Intellectual Property Office of the People's Republic of China (SIPO), which is incorporated herein in its entirety.

TECHNICAL FIELD

The present disclosure relates to an optical imaging lens, and particularly, to an optical imaging lens having five lens elements.

BACKGROUND

Technology for mobile electronic devices is improving constantly. Further, key components of mobile electronic devices such as optical imaging lens are updated frequently. As a result, applications of mobile electronic devices are no longer limited to taking pictures or videos. To satisfy consumer demands and perform various optical applications, mobile electronic devices may utilize a telephoto lens to achieve a larger field of view. As the focal length of the mobile electronic device is lengthened, the amplification factor of the optical zoom of the mobile electronic device increases.

However, the focal length of the lens is inversely proportional to an amount of light entering the lens. Further, the effective radius and the volume of the lens are increased when the size of the aperture is increased. Therefore, it may be desirable to increase the focal length to about 8 mm or more than about 8 mm, and to increase the size of the aperture and the amount of light (Fno is less than 2.6) without affecting the lens volume (the effective radius is less than about 2.5 mm).

SUMMARY

The present disclosure relates to an optical imaging lens. By designing convex and/or concave surfaces of lens elements, the length of the optical imaging lens may be shortened while still maintaining good optical characteristics and imaging quality.

In the present disclosure, parameters used herein may be chosen from but not limited to parameters listed below:

| Parameter | Definition |
|---|---|
| T1 | The central thickness of the first lens element along the optical axis |
| G12 | The air gap between the first lens element and the second lens element along the optical axis |
| T2 | The central thickness of the second lens element along the optical axis |
| G23 | The air gap between the second lens element and the third lens element along the optical axis |
| T3 | The central thickness of the third lens element along the optical axis |
| G34 | The air gap between the third lens element and the fourth lens element along the optical axis |
| T4 | The central thickness of the fourth lens element along the optical axis |
| G45 | The air gap between the fourth lens element and the fifth lens element along the optical axis |
| T5 | The central thickness of the fifth lens element along the optical axis |
| G5F | The air gap between the fifth lens element and the filtering unit along the optical axis |
| TF | The central thickness of the filtering unit along the optical axis |
| GFP | The air gap between the filtering unit and an image plane along the optical axis |
| f1 | The focusing length of the first lens element |
| f2 | The focusing length of the second lens element |
| f3 | The focusing length of the third lens element |
| f4 | The focusing length of the fourth lens element |
| f5 | The focusing length of the fifth lens element |
| n1 | The refracting index of the first lens element |
| n2 | The refracting index of the second lens element |
| n3 | The refracting index of the third lens element |
| n4 | The refracting index of the fourth lens element |
| n5 | The refracting index of the fifth lens element |
| v1 | The Abbe number of the first lens element |
| v2 | The Abbe number of the second lens element |
| v3 | The Abbe number of the third lens element |
| v4 | The Abbe number of the fourth lens element |
| v5 | The Abbe number of the fifth lens element |
| HFOV | Half Field of View of the optical imaging lens |
| Fno | F-number of the optical imaging lens |
| EFL | The effective focal length of the optical imaging lens |
| TTL | The distance from the object-side surface of the first lens element to an image plane along the optical axis |
| ALT | The sum of the central thicknesses from the first lens element to the fifth lens element |
| AAG | The sum of all air gaps from the first lens element to the fifth lens element along the optical axis |
| BFL | The back focal length of the optical imaging lens/The distance from the image-side surface of the fifth lens element to the image plane along the optical axis |
| TL | The distance from the object-side surface of the first lens element to the image-side surface of the fifth lens element along the optical axis |

According to one embodiment of the present disclosure, an optical imaging lens may comprise, sequentially from an object side to an image side along an optical axis, first, second, third, fourth, and fifth lens elements. Each of the first, second, third, fourth, and fifth lens elements may have varying refracting power in some embodiments. Additionally, each of the first to fifth lens elements may comprise an object-side surface facing toward the object side, an image-side surface facing toward the image side, and a central thickness defined along the optical axis. Moreover, the first lens element may have a positive refracting power, the object-side surface of the second lens element may comprise a convex portion in a vicinity of a periphery of the second lens element, the object-side surface of the third lens element may comprise a convex portion in a vicinity of a periphery of the third lens element, the image-side surface of the fourth lens element may comprise a concave portion in a vicinity of a periphery of the fourth lens element, and the object-side surface and the image-side surface of the fifth lens element may be aspherical surfaces. The effective radius of each of the first, second, third, fourth, and fifth lens elements may be smaller or equal to about 2.5 mm and the focal length of the optical imaging lens may be between about 8 mm and about 13.5 mm.

According to one embodiment of the present disclosure, an optical imaging lens may comprise, sequentially from an object side to an image side along an optical axis, first, second, third, fourth, and fifth lens elements. Each of the first to fifth lens elements may have varying refracting power in some embodiments. Additionally, each of the first, second, third, fourth, and fifth lens elements may comprise an object-side surface facing toward the object side, an image-side surface facing toward the image side, and a central thickness defined along the optical axis. Moreover, the first lens element may have a positive refracting power and the image-side surface of the first lens element may comprise a concave portion in a vicinity of the optical axis and a concave portion in a vicinity of a periphery of the first lens element, the object-side surface of the second lens element may comprise a convex portion in a vicinity of a periphery of the second lens element, the third lens element may have a positive refracting power and the object-side surface of the third lens element may comprise a convex portion in a vicinity of a periphery of the third lens element, the image-side surface of the fourth lens element may comprise a concave portion in a vicinity of a periphery of the fourth lens element, and the object-side surface and the image-side surface of the fifth lens element may be aspherical surfaces. The optical imaging lens may further comprise an aperture stop located between the first lens element and the third lens element.

According to one embodiment of the present disclosure, an optical imaging lens may comprise, sequentially from an object side to an image side along an optical axis, first, second, third, fourth, and fifth lens elements. Each of the first to fifth lens elements may have varying refracting power in some embodiments. Additionally, each of the first, second, third, fourth, and fifth lens elements may comprise an object-side surface facing toward the object side, an image-side surface facing toward the image side, and a central thickness defined along the optical axis. Moreover, the first lens element may have a positive refracting power and the image-side surface of the first lens element may comprise a concave portion in a vicinity of the optical axis and a concave portion in a vicinity of a periphery of the first lens element, the object-side surface of the second lens element may comprise a convex portion in a vicinity of the optical axis and a convex portion in a vicinity of a periphery of the second lens element, the object-side surface of the third lens element may comprise a convex portion in a vicinity of a periphery of the third lens element, the image-side surface of the fourth lens element may comprise a concave portion in a vicinity of a periphery of the fourth lens element, and the object-side surface and the image-side surface of the fifth lens element may be aspherical surfaces. The optical imaging lens may further comprise an aperture stop located between the first lens element and the third lens element.

Moreover, the above embodiments of the optical imaging lens may comprise no other lenses having refracting power beyond the five lens elements while these embodiments may satisfy any one of inequalities as follows:

| | |
|---|---|
| $AAG/T2 \leq 4.71$ | Inequality (1); |
| $(AAG+T5)/T1 \leq 3.01$ | Inequality (2); |
| $TTL/FL \leq 3.61$ | Inequality (3); |
| $TTL/ALT \leq 2.21$ | Inequality (4); |
| $ALT/(T1+T3+T4) \leq 1.8$ | Inequality (5); |
| $(T2+G23+G34+G45+T5)/T1 \leq 3.3$ | Inequality (6); |
| $AAG/G23 \leq 4$ | Inequality (7); |
| $(AAG+T2)/T4 \leq 8.51$ | Inequality (8); |
| $EFL/BFL \leq 4.2$ | Inequality (9); |
| $(G12+T2+G45+T5)/T1 \leq 2.2$ | Inequality (10); |
| $(AAG+T5)/(T2+G23) \leq 4.2$ | Inequality (11); |
| $(T2+G23+G34+G45+T5)/T3 \leq 6$ | Inequality (12); |
| $AAG/T4 \leq 7.2$ | Inequality (13); |
| $(AAG+T2)/T5 \leq 4.6$ | Inequality (14); |
| $EFL/ALT \leq 2.4$ | Inequality (15); |
| $(G12+T2+G45+T5)/T3 \leq 4.1$ | Inequality (16); and |
| $v5 \leq 35$ | Inequality (17). |

BRIEF DESCRIPTION OF THE DRAWINGS

Exemplary embodiments will be more readily understood from the following detailed description when read in conjunction with the appended drawing, in which:

FIG. 1 depicts a cross-sectional view of one single lens element according to the present disclosure;

FIG. 2 depicts a schematic view of the relation between the surface shape and the optical focus of the lens element;

FIG. 3 depicts a schematic view of a first example of the surface shape and the effective radius of the lens element;

FIG. 4 depicts a schematic view of a second example of the surface shape and the effective radius of the lens element;

FIG. 5 depicts a schematic view of a third example of the surface shape and the effective radius of the lens element;

FIG. 8 depicts a table of optical data for each lens element of the optical imaging lens of a first embodiment of the present disclosure;

FIG. 9 depicts a table of aspherical data of a first embodiment of the optical imaging lens according to the present disclosure;

FIG. 12 depicts a table of optical data for each lens element of the optical imaging lens of a second embodiment of the present disclosure;

FIG. 13 depicts a table of aspherical data of a second embodiment of the optical imaging lens according to the present disclosure;

FIG. 16 depicts a table of optical data for each lens element of the optical imaging lens of a third embodiment of the present disclosure;

FIG. 17 depicts a table of aspherical data of a third embodiment of the optical imaging lens according to the present disclosure;

FIG. 20 depicts a table of optical data for each lens element of the optical imaging lens of a fourth embodiment of the present disclosure;

FIG. 21 depicts a table of aspherical data of a fourth embodiment of the optical imaging lens according to the present disclosure;

FIG. 24 depicts a table of optical data for each lens element of the optical imaging lens of a fifth embodiment of the present disclosure;

FIG. 25 depicts a table of aspherical data of a fifth embodiment of the optical imaging lens according to the present disclosure;

FIG. 28 depicts a table of optical data for each lens element of a sixth embodiment of an optical imaging lens according to the present disclosure;

FIG. 29 depicts a table of aspherical data of a sixth embodiment of the optical imaging lens according to the present disclosure;

FIG. 32 depicts a table of optical data for each lens element of the optical imaging lens of a seventh embodiment of the present disclosure;

FIG. 33 depicts a table of aspherical data of a seventh embodiment of the optical imaging lens according to the present disclosure;

FIG. 36 depicts a table of optical data for each lens element of the optical imaging lens of an eighth embodiment of the present disclosure;

FIG. 37 depicts a table of aspherical data of an eighth embodiment of the optical imaging lens according to the present disclosure;

FIG. 40 depicts a table of optical data for each lens element of the optical imaging lens of a ninth embodiment of the present disclosure;

FIG. 41 depicts a table of aspherical data of a ninth embodiment of the optical imaging lens according to the present disclosure;

FIG. 44 depicts a table of optical data for each lens element of the optical imaging lens of a tenth embodiment of the present disclosure;

FIG. 45 depicts a table of aspherical data of a tenth embodiment of the optical imaging lens according to the present disclosure;

FIGS. 46 is a table for values of T1, G12, T2, G23, T3, G34, T4, G45, T5, G5, TF, GFP, BFL, ALT, AAG, TTL, TL, EFL/ALT, EFL/BFL, TTL/BFL, TTL/ALT, ALT/(T1+T3+T4), (T2+G23+G34+G45+T5)/T1, (T2+G23+G34+G45+T5)/T3, (G12+T2+G45+T5)/T1, (G12+T2+G45+T5)/T3, (AAG+T5)/T1, (AAG+T5)/(T2+G23), (AAG+T2)/T4, (AAG+T2)/T5, AAG/T2, AAG/G23, AAG/T4 of the all example embodiments.

DETAILED DESCRIPTION

Figures 6, 7:
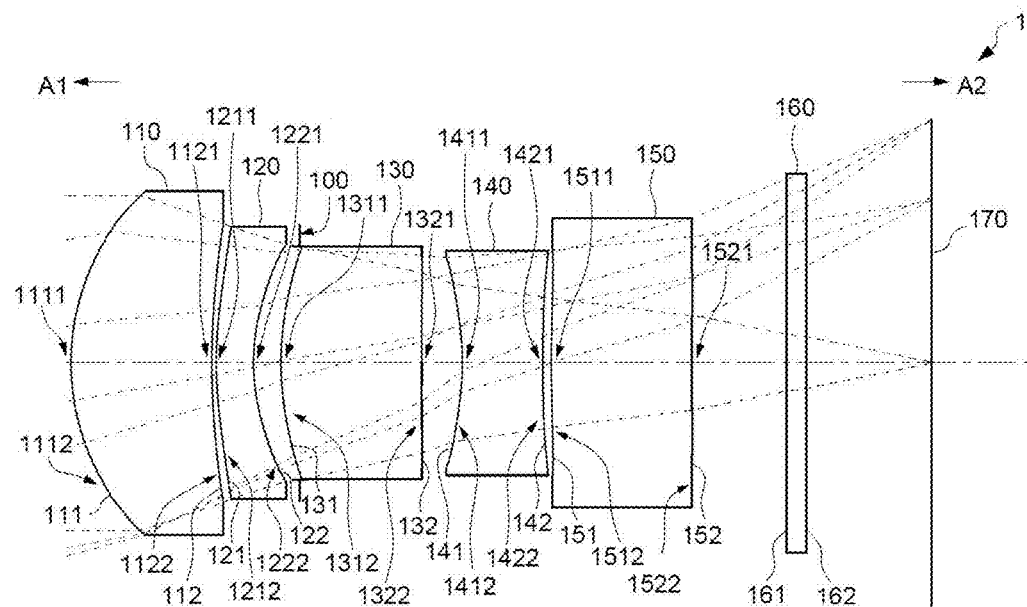
FIG. 6 depicts a cross-sectional view of a first embodiment of an optical imaging lens having seven lens elements according to the present disclosure.
FIG. 7 depicts a chart of longitudinal spherical aberration and other kinds of optical aberrations of a first embodiment of the optical imaging lens according to the present disclosure.

For a more complete understanding of the present disclosure and its advantages, reference may now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although they may, and various example embodiments may be readily combined and interchanged without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon," depending on the context. Furthermore, as used herein, the words "and/or" may refer to and encompass any and all possible combinations of one or more of the associated listed items.

In the present disclosure, the description "a lens element having positive refracting power (or negative refracting power)" means that the paraxial refracting power of the lens element in Gaussian optics is positive (or negative). The description "An object-side (or image-side) surface of a lens element" may include a specific region of that surface of the lens element where imaging rays are capable of passing through that region, namely the clear aperture of the surface. The aforementioned imaging rays may be classified into two types, chief ray Lc and marginal ray Lm. Taking a lens element depicted in FIG. 1 as an example, the lens element may be rotationally symmetric, where the optical axis I is the axis of symmetry. The region A of the lens element is defined as "a part in a vicinity of the optical axis," and the region C of the lens element is defined as "a part in a vicinity of a periphery of the lens element." Besides, the lens element may also have an extending part E extended radially and outwardly from the region C, namely the part outside of the clear aperture of the lens element. The extending part E may be used for physically assembling the lens element into an optical imaging lens system. Under normal circumstances, the imaging rays would not pass through the extending part E because those imaging rays only pass through the clear aperture. The structures and shapes of the aforementioned extending part E are only examples for technical explanation, the structures and shapes of lens elements should not be limited to these examples. Note that the extending parts of the lens element surfaces depicted in the following embodiments are partially omitted.

The following criteria are provided for determining the shapes and the parts of lens element surfaces set forth in the present disclosure. These criteria mainly determine the boundaries of parts under various circumstances including the part in a vicinity of the optical axis, the part in a vicinity of a periphery of a lens element surface, and other types of lens element surfaces such as those having multiple parts.

FIG. 1 depicts a radial cross-sectional view of a lens element. Before determining boundaries of those aforementioned portions, two referential points should be defined first, the central point and the transition point. The central point of a surface of a lens element may be a point of intersection of that surface and the optical axis. The transition point may be a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface may be defined as the radial distance from the optical axis I to a point of intersection of the marginal ray Lm and the surface of the lens element.

Referring to FIG. 2, determining whether the shape of a portion is convex or concave may depend on whether a collimated ray passing through that portion converges or diverges. That is, while applying a collimated ray to a portion to be determined in terms of shape, the collimated ray passing through that portion may be bended and the ray itself or its extension line may eventually meet the optical axis. The shape of that portion may be determined by whether the ray or its extension line meets (intersects) the optical axis (focal point) at the object-side or image-side. For instance, if the ray itself intersects the optical axis at the image side of the lens element after passing through a portion, e.g., the focal point of this ray is at the image side (see point R in FIG. 2), the portion may be determined as having a convex shape. On the contrary, if the ray diverges after passing through a portion, the extension line of the ray intersects the optical axis at the object side of the lens element, e.g., the focal point of the ray is at the object side (see point M in FIG. 2), that portion may be determined as having a concave shape. Therefore, referring to FIG. 2, the portion between the central point and the first transition point may have a convex shape, the portion located radially outside of the first transition point may have a concave shape, and the first transition point is the point where the portion having a convex shape changes to the portion having a concave shape, namely the border of two adjacent portions. Alternatively, there is another method to determine whether a portion in a vicinity of the optical axis may have a convex or concave shape by referring to the sign of an "R" value, which is the (paraxial) radius of curvature of a lens surface. The R value may be used in conventional optical design software such as Zemax and CodeV. The R value may appear in the lens data sheet in the software. For an object-side surface, positive R may mean that the object-side surface is convex, and negative R may mean that the object-side surface is concave. Conversely, for an image-side surface, positive R may mean that the image-side surface is concave, and negative R may mean that the image-side surface is convex. The result found by using this method may be consistent with the result found using the other way mentioned above, which may determine surface shapes by referring to whether the focal point of a collimated ray is at the object side or the image side.

For none transition point cases, the portion in a vicinity of the optical axis may be defined as the portion between 0-50% of the effective radius (radius of the clear aperture) of the surface, whereas the portion in a vicinity of a periphery of the lens element may be defined as the portion between 50-100% of effective radius (radius of the clear aperture) of the surface.

Referring to the first example depicted in FIG. 3, only one transition point, namely a first transition point, appears within the clear aperture of the image-side surface of the lens element. Portion I may be a portion in a vicinity of the optical axis, and portion II may be a portion in a vicinity of a periphery of the lens element. The portion in a vicinity of the optical axis may be determined as having a concave surface due to the R value at the image-side surface of the lens element is positive. The shape of the portion in a vicinity of a periphery of the lens element may be different from that of the radially inner adjacent portion, e.g., the shape of the portion in a vicinity of a periphery of the lens element may be different from the shape of the portion in a vicinity of the optical axis; the portion in a vicinity of a periphery of the lens element may have a convex shape.

Referring to the second example depicted in FIG. 4, a first transition point and a second transition point may exist on the object-side surface (within the clear aperture) of a lens element. Here, portion I may be the portion in a vicinity of the optical axis, and portion III may be the portion in a vicinity of a periphery of the lens element. The portion in a vicinity of the optical axis may have a convex shape because the R value at the object-side surface of the lens element may be positive. The portion in a vicinity of a periphery of the lens element (portion III) may have a convex shape. What is more, there may be another portion having a concave shape existing between the first and second transition point (portion II).

Referring to a third example depicted in FIG. 5, no transition point may exist on the object-side surface of the lens element. In this case, the portion between 0-50% of the effective radius (radius of the clear aperture) may be determined as the portion in a vicinity of the optical axis, and the portion between 50-100% of the effective radius may be determined as the portion in a vicinity of a periphery of the lens element. The portion in a vicinity of the optical axis of the object-side surface of the lens element may be determined as having a convex shape due to its positive R value, and the portion in a vicinity of a periphery of the lens element may be determined as having a convex shape as well.

Several exemplary embodiments and associated optical data will now be provided to illustrate non-limiting examples of optical imaging lens systems having good optical characteristics while increasing the field of view. Reference is now made to FIGS. 6-9. FIG. 6 illustrates an example cross-sectional view of an optical imaging lens 1 having five lens elements according to a first example embodiment. FIG. 7 shows example charts of longitudinal spherical aberration and other kinds of optical aberrations of the optical imaging lens 1 according to the first example embodiment. FIG. 8 illustrates an example table of optical data of each lens element of the optical imaging lens 1 according to the first example embodiment. FIG. 9 depicts an example table of aspherical data of the optical imaging lens 1 according to the first example embodiment.

As shown in FIG. 6, the optical imaging lens 1 of the present embodiment may comprise, in order from an object side A1 to an image side A2 along an optical axis, a first lens element 110, a second lens element 120, an aperture stop 100, a third lens element 130, a fourth lens element 140, and a fifth lens element 150. A filtering unit 160 and an image plane 170 of an image sensor (not shown) are positioned at the image side A2 of the optical imaging lens 1. Each of the first, second, third, fourth, and fifth lens elements 110, 120, 130, 140, 150 and the filtering unit 160 may comprise an object-side surface 111, 121, 131, 141, 151, 161 facing toward the object side A1 and an image-side surface 112, 122, 132, 142, 152, 162 facing toward the image side A2. The example embodiment of the filtering unit 160 illustrated is an IR cut filter (infrared cut filter) positioned between the fifth lens element 150 and an image plane 170. The filtering unit 160 selectively may absorb light passing optical imaging lens 1 that has a specific wavelength. For example, if IR light is absorbed, IR light which is not seen by human eyes may be prohibited from producing an image on the image plane 170.

Exemplary embodiments of each lens element of the optical imaging lens 1 may now be described with reference to the drawings. The lens elements of the optical imaging lens 1 may be constructed using plastic materials in this embodiment.

An example embodiment of the first lens element 110 may have positive refracting power. The object-side surface 111 may comprise a convex portion 1111 in a vicinity of an optical axis and a convex portion 1112 in a vicinity of a periphery of the first lens element 110. The image-side surface 112 may comprise a concave portion 1121 in a vicinity of the optical axis and a concave portion 1122 in a vicinity of the periphery of the first lens element 110.

An example embodiment of the second lens element 120 may have negative refracting power. The object-side surface 121 may comprise a convex portion 1211 in a vicinity of the optical axis and a convex portion 1212 in a vicinity of a periphery of the second lens element 120. The image-side surface 122 may comprise a concave portion 1221 in a vicinity of the optical axis and a concave portion 1222 in a vicinity of the periphery of the second lens element 120.

An example embodiment of the third lens element 130 may have positive refracting power. The object-side surface 131 may comprise a convex portion 1311 in a vicinity of the optical axis and a convex portion 1312 in a vicinity of a periphery of the third lens element 130. The image-side surface 132 may comprise a convex portion 1321 in a vicinity of the optical axis and a convex portion 1322 in a vicinity of the periphery of the third lens element 130.

An example embodiment of the fourth lens element 140 may have negative refracting power. The object-side surface 141 may comprise a concave portion 1411 in a vicinity of the optical axis and a concave portion 1412 in a vicinity of a periphery of the fourth lens element 140. The image-side surface 142 may comprise a concave portion 1421 in a vicinity of the optical axis and a concave portion 1422 in a vicinity of the periphery of the fourth lens element 140.

An example embodiment of the fifth lens element 150 may have positive refracting power. The object-side surface 151 may comprise a convex portion 1511 in a vicinity of the optical axis and a concave portion 1512 in a vicinity of a periphery of the fifth lens element 150. The image-side surface 152 may comprise a concave portion 1521 in a vicinity of the optical axis and a convex portion 1522 in a vicinity of the periphery of the fifth lens element 150.

The aspherical surfaces including the object-side surface 111 of the first lens element 110, the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150 may all be defined by the following aspherical formula (1):

$$Z(Y) = \frac{Y^2}{R} \bigg/ \left(1 + \sqrt{1 - (1+K)\frac{Y^2}{R^2}}\right) + \sum_{i=1}^{n} a_i \times Y^i \qquad \text{formula (1)}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant; and $a_i$ represents an aspherical coefficient of $i^{th}$ level.

The values of each aspherical parameter are shown in FIG. 9.

FIG. 7(a) shows the longitudinal spherical aberration, wherein the horizontal axis of FIG. 7(a) defines the focus, and the vertical axis of FIG. 7(a) defines the field of view. FIG. 7(b) shows the astigmatism aberration in the sagittal direction, wherein the horizontal axis of FIG. 7(b) defines the focus, and the vertical axis of FIG. 7(b) defines the image height. FIG. 7(c) shows the astigmatism aberration in the tangential direction, wherein the horizontal axis of FIG. 7(c) defines the focus, and the vertical axis of FIG. 7(c) defines the image height. FIG. 7(d) shows the variation of the distortion aberration, wherein the horizontal axis of FIG. 7(d) defines the percentage, and the vertical axis of FIG. 7(d) defines the image height. The three curves with different wavelengths (about 470 nm, about 555 nm, about 650 nm) represent that off-axis light with respect to these wavelengths may be focused around an image point. From the vertical deviation of each curve shown in FIG. 7(a), the offset of the off-axis light relative to the image point may be within about ±0.08 mm. Therefore, the first embodiment may improve the longitudinal spherical aberration with respect to different wavelengths. Referring to FIG. 7(b), the focus variation with respect to the three different wavelengths (about 470 nm, about 555 nm, about 650 nm) in the whole field may fall within about ±0.2 mm. Referring to FIG. 7(c), the focus variation with respect to the three different wavelengths (about 470 nm, about 555 nm, about 650 nm) in the whole field may fall within about ±0.5 mm. Referring to FIG. 7(d), the horizontal axis of FIG. 7(d), the variation of the distortion aberration may be within about ±12%.

The values of T1, G12, T2, G23, T3, G34, T4, G45, T5, G5, TF, GFP, BFL, ALT, AAG, TTL, TL, EFL/ALT, EFL/BFL, TTL/BFL, TTL/ALT, ALT/(T1+T3+T4), (T2+G23+G34+G45+T5)/T1, (T2+G23+G34+G45+T5)/T3, (G12+T2+G45+T5)/T1, (G12+T2+G45+T5)/T3, (AAG+T5)/T1, (AAG+T5)/(T2+G23), (AAG+T2)/T4, (AAG+T2)/T5, AAG/T2, AAG/G23, AAG/T4 of this embodiment may be referenced in FIG. 46.

The distance from the object-side surface 111 of the first lens element 110 to the image plane 170 along the optical axis (TTL) may be about 9.147 mm, Fno may be about 2.390 (the size of aperture decreases while Fno increases), HFOV may be about 14.90 degrees. When the value of Fno is smaller, the size of the aperture stop and the amounts of light entering into the optical imaging lens may be larger. In accordance with these values, the present embodiment may provide an optical imaging lens having a shortened length while maintaining more advantageous amounts of light entering into the optical imaging lens.

Figure 10:
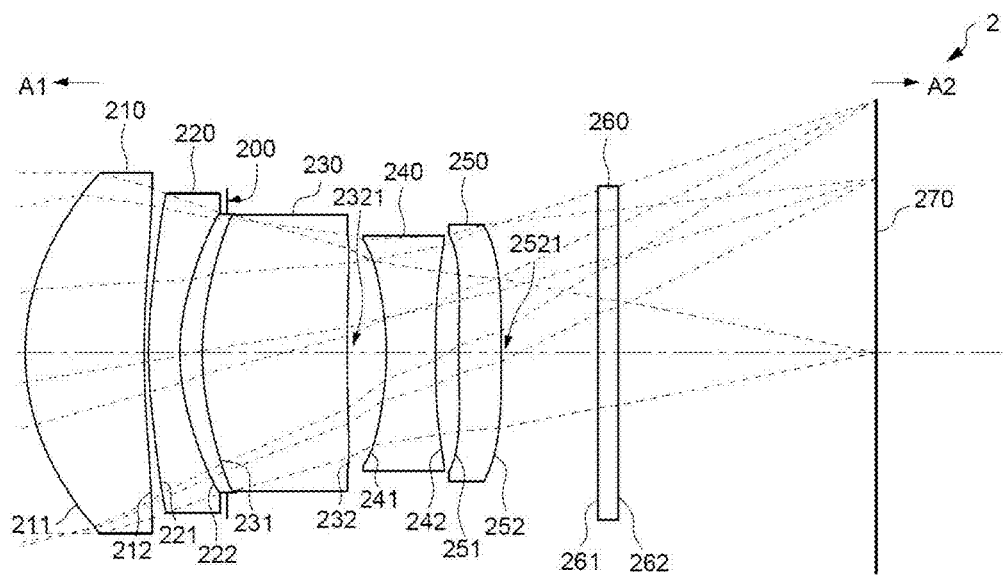
FIG. 10 depicts a cross-sectional view of a second embodiment of an optical imaging lens having seven lens elements according to the present disclosure.
Figure 11:
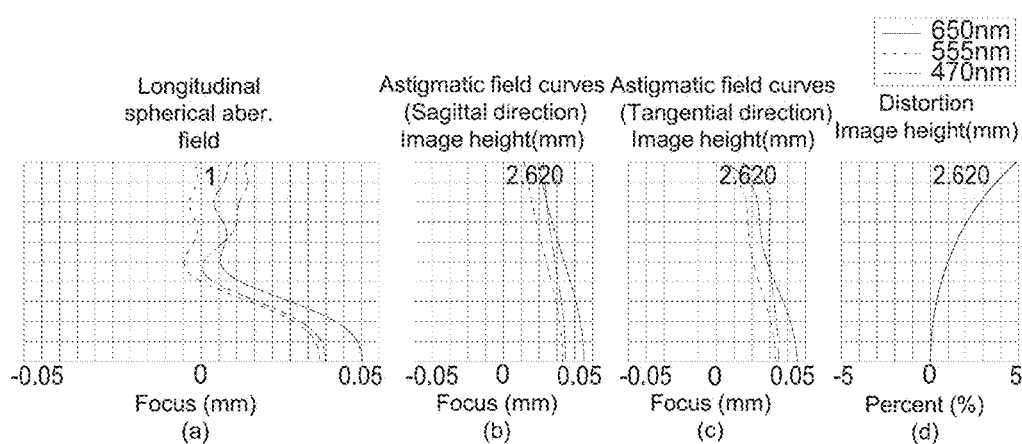
FIG. 11 depicts a chart of longitudinal spherical aberration and other kinds of optical aberrations of a second embodiment of the optical imaging lens according the present disclosure.

Reference is now made to FIGS. 10-13. FIG. 10 illustrates an example cross-sectional view of an optical imaging lens 2 having five lens elements according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment may be similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical imaging lens 2 of the present embodiment, in an order from an object side A1 to an image side A2 along an optical axis, may comprise a first lens element 210, a second lens element 220, an aperture stop 200, a third lens element 230, a fourth lens element 240, and a fifth lens element 250.

The arrangements of convex or concave surface structures including the object-side surfaces 211, 221, 231, 241, 251 and the image-side surfaces 212, 222, 242 may be generally similar to the optical imaging lens 1, but the differences between the optical imaging lens 1 and the optical imaging lens 2 may include the convex or concave surface of image-side surfaces 232 and 252 being different from the optical imaging lens 1. Additional differences may include a radius of curvature, a thickness, an aspherical data, and an effective focal length of each lens element. More specifically, the image-side surface 232 of the third lens element 230 may comprise a concave portion 2321 in a vicinity of the optical axis, the image-side surface 252 of the fifth lens element 250 may comprise a convex portion 2521 in a vicinity of the optical axis.

Here, in the interest of clearly showing the drawings of a particular embodiment, only the surface shapes which may be different from that in the first embodiment are labeled. Please refer to FIG. 12 for the optical characteristics of each lens element in the optical imaging lens 2 of the present embodiment.

From the vertical deviation of each curve shown in FIG. 11(a), the offset of the off-axis light relative to the image point may be within about ±0.45 mm. Referring to FIG. 11(b), the focus variation with respect to the three different wavelengths (about 470 nm, about 555 nm, about 650 nm) in the whole field may fall within about ±0.45 mm. Referring to FIG. 11(c), the focus variation with respect to the three different wavelengths (about 470 nm, about 555 nm, about 650 nm) in the whole field may fall within about ±0.35 mm. Referring to FIG. 11(d), the variation of the distortion aberration of the optical imaging lens 2 may be within about ±5%.

The values of T1, G12, T2, G23, T3, G34, T4, G45, T5, G5, TF, GFP, BFL, ALT, AAG,TTL,TL,EFL/ALT,EFL/BFL, TTL/BFL,TTL/ALT,ALT/(T1+T3+T4), (T2+G23+G34+G45+T5)/T1, (T2+G23+G34+G45+T5)/T3, (G12+T2+G45+T5)/T1, (G12+T2+G45+T5)/T3, (AAG+T5)/T1, (AAG+T5)/(T2+G23), (AAG+T2)/T4, (AAG+T2)/T5, AAG/T2, AAG/G23, AAG/T4 of this embodiment may be referred to FIG. 46.

In comparison with the first embodiment, the astigmatism aberration in the tangential direction may be smaller, Fno may be the same but TTL may be smaller. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 14:
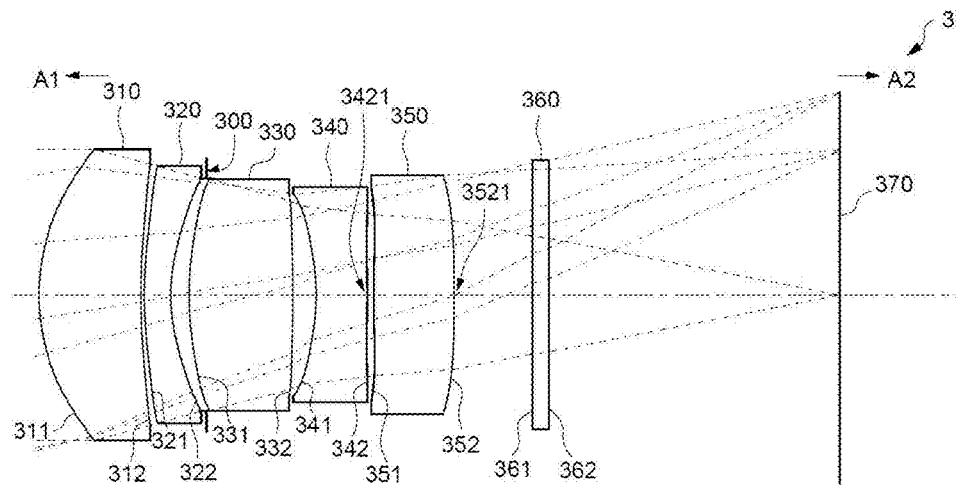
FIG. 14 depicts a cross-sectional view of a third embodiment of an optical imaging lens having seven lens elements according to the present disclosure.
Figure 15:
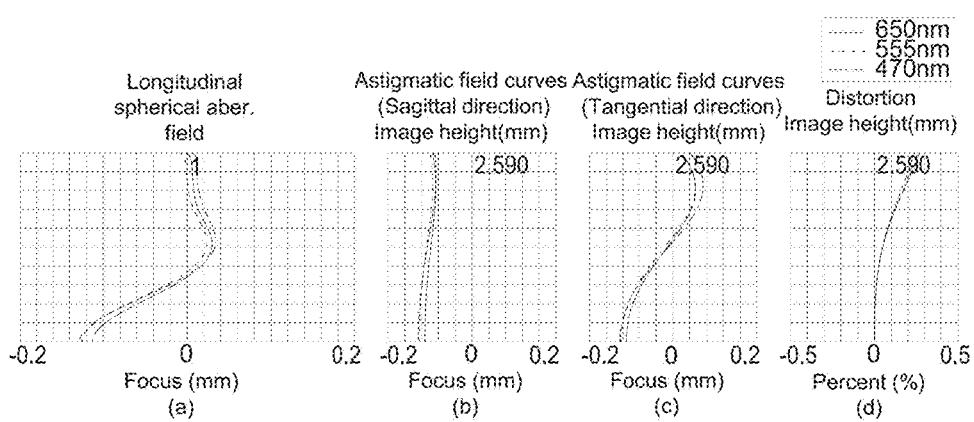
FIG. 15 depicts a chart of longitudinal spherical aberration and other kinds of optical aberrations of a third embodiment of the optical imaging lens according the present disclosure.

Reference is now made to FIGS. 14-17. FIG. 14 illustrates an example cross-sectional view of an optical imaging lens 3 having five lens elements according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment may be similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical imaging lens 3 of the present embodiment, in an order from an object side A1 to an image side A2 along an optical axis, may comprise a first lens element 310, a second lens element 320, an aperture stop 300, a third lens element 330, a fourth lens element 340, and a fifth lens element 350.

The arrangements of the convex or concave surface structures, including the object-side surfaces 311, 321, 331, 341, 351 and the image-side surfaces 312, 322, 332 may be generally similar to the optical imaging lens 1, but the differences between the optical imaging lens 1 and the optical imaging lens 3 may include the convex or concave surface structure of the image-side surfaces 342 and 352 being different. Additional differences may include a radius of curvature, a thickness, aspherical data, and an effective focal length of each lens element. More specifically, the image-side surface 342 of the fourth lens element 340 may comprise a convex portion 3421 in a vicinity of the optical axis, and the image-side surface 352 of the fifth lens element 350 may comprise a convex portion 3521 in a vicinity of the optical axis.

Here, in the interest of clearly showing the drawings of a particular embodiment, only the surface shapes which may be different from that in the first embodiment are labeled. Please refer to FIG. 16 for the optical characteristics of each lens element in the optical imaging lens 3 of the present embodiment.

From the vertical deviation of each curve shown in FIG. 15(a), the offset of the off-axis light relative to the image point may be within about ±0.14 mm. Referring to FIG. 15(b), the focus variation with respect to the three different wavelengths (about 470 nm, about 555 nm, about 650 nm) in the whole field may fall within about ±0.14 mm. Referring to FIG. 15(c), the focus variation with respect to the three different wavelengths (about 470 nm, about 555 nm, about 650 nm) in the whole field may fall within about ±0.14 mm. Referring to FIG. 15(d), the variation of the distortion aberration of the optical imaging lens 3 may be within about ±0.3%.

The values of T1, G12, T2, G23, T3, G34, T4, G45, T5, G5, TF, GFP, BFL, ALT, AAG,TTL,TL,EFL/ALT,EFL/BFL, TTL/BFL,TTL/ALT,ALT/(T1+T3+T4), (T2+G23+G34+ G45+T5)/T1, (T2+G23+G34+G45+T5)/T3, (G12+T2+ G45+T5)/T1, (G12+T2+G45+T5)/T3, (AAG+T5)/T1, (AAG+T5)/(T2+G23), (AAG+T2)/T4, (AAG+T2)/T5, AAG/T2, AAG/G23, AAG/T4 of this embodiment may be referred to FIG. 46.

In comparison with the first embodiment, the astigmatism aberrations in the sagittal direction and in the tangential direction may be smaller, the variation of the distortion aberration may be smaller, and Fno may be the same. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 18:
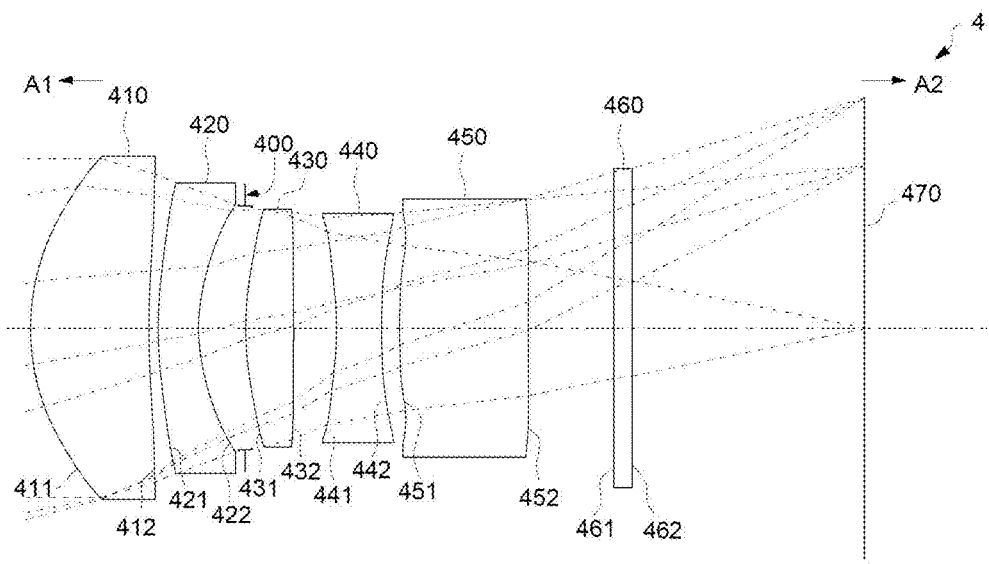
FIG. 18 depicts a cross-sectional view of a fourth embodiment of an optical imaging lens having seven lens elements according to the present disclosure.
Figure 19:
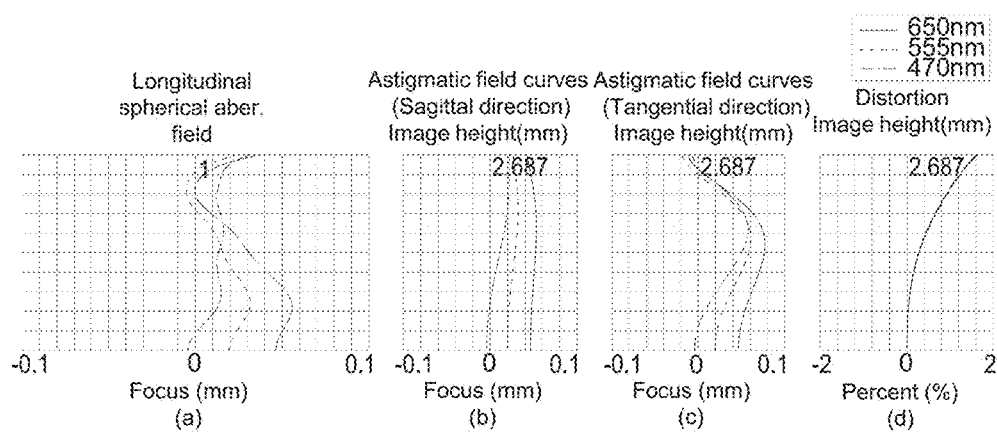
FIG. 19 depicts a chart of longitudinal spherical aberration and other kinds of optical aberrations of a fourth embodiment of the optical imaging lens according to the present disclosure.

Reference is now made to FIGS. 18-21. FIG. 18 illustrates an example cross-sectional view of an optical imaging lens 4 having five lens elements according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment may be similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical imaging lens 4 of the present embodiment, in an order from an object side A1 to an image side A2 along an optical axis, may comprise a first lens element 410, a second lens element 420, an aperture stop 400, a third lens element 430, a fourth lens element 440, and a fifth lens element 450.

The arrangements of the convex or concave surface structures, including the object-side surfaces 411, 421, 431, 441, 451 and the image-side surfaces 412, 422, 432, 442, 452 may be generally similar to the optical imaging lens 1, but additional differences may include a radius of curvature, a thickness, aspherical data, and an effective focal length of each lens element being different.

Here, in the interest of clearly showing the drawings of a particular embodiment, only the surface shapes which may be different from that in the first embodiment are labeled. Please refer to FIG. 20 for the optical characteristics of each lens elements in the optical imaging lens 4 of the present embodiment.

From the vertical deviation of each curve shown in FIG. 19(a), the offset of the off-axis light relative to the image point may be within about ±0.06 mm. Referring to FIG. 19(b), the focus variation with respect to the three different wavelengths (about 470 nm, about 555 nm, about 650 nm) in the whole field may fall within about ±0.05 mm. Referring to FIG. 19(c), the focus variation with respect to the three different wavelengths (about 470 nm, about 555 nm, about 650 nm) in the whole field may fall within about ±0.08 mm. Referring to FIG. 19(d), the variation of the distortion aberration of the optical imaging lens 4 may be within about ±1.6%.

The values of T1, G12, T2, G23, T3, G34, T4, G45, T5, G5, TF, GFP, BFL, ALT, AAG,TTL,TL,EFL/ALT,EFL/BFL, TTL/BFL,TTL/ALT,ALT/(T1+T3+T4), (T2+G23+G34+ G45+T5)/T1, (T2+G23+G34+G45+T5)/T3, (G12+T2+ G45+T5)/T1, (G12+T2+G45+T5)/T3, (AAG+T5)/T1, (AAG+T5)/(T2+G23), (AAG+T2)/T4, (AAG+T2)/T5, AAG/T2, AAG/G23, AAG/T4 of this embodiment may be referred to FIG. 46.

In comparison with the first embodiment, the longitudinal spherical aberration may be smaller, the astigmatism aberrations in the sagittal direction and in the tangential direction may be smaller, the variation of the distortion aberration may be smaller, Fno may be the same. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 22:
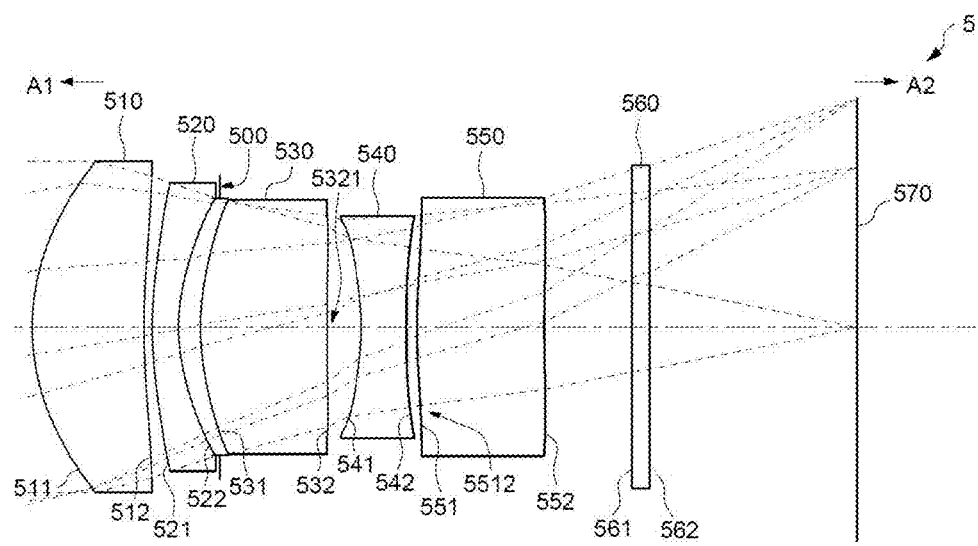
FIG. 22 depicts a cross-sectional view of a fifth embodiment of an optical imaging lens having seven lens elements according to the present disclosure.
Figure 23:
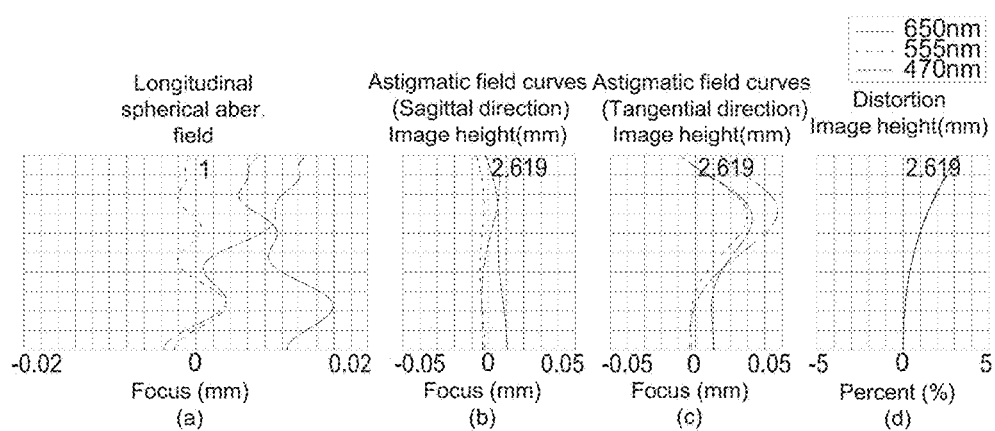
FIG. 23 depicts a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having five lens elements according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment may be similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical imaging lens 5 of the present embodiment, in an order from an object side A1 to an image side A2 along an optical axis, may comprise a first lens element 510, a second lens element 520, an aperture stop 500, a third lens element 530, a fourth lens element 540, and a fifth lens element 550.

The arrangements of the convex or concave surface structures, including the object-side surfaces 511, 521, 531, 541 and the image-side surfaces 512, 522, 542, 552 may be generally similar to the optical imaging lens 1, but the differences between the optical imaging lens 1 and the optical imaging lens 5 may include the convex or concave surface structure of the object-side surface 551 and image-side surface 532 being different. Additional differences may include a radius of curvature, a thickness, aspherical data, and an effective focal length of each lens element. More specifically, the image-side surface 532 of the third lens element 530 may include a concave portion 5321 in a vicinity of the optical axis, and the object-side surface 551 of the fifth lens element 550 may comprise a convex portion 5512 in a vicinity of a periphery of the fifth lens element 550.

Here, in the interest of clearly showing the drawings of a particular embodiment, only the surface shapes which may be different from that in the first embodiment are labeled. FIG. 24 depicts the optical characteristics of each lens elements in the optical imaging lens 5 of the present embodiment.

From the vertical deviation of each curve shown in FIG. 23(a), the offset of the off-axis light relative to the image point may be within about ±0.016 mm. Referring to FIG. 23(b), the focus variation with respect to the three different wavelengths (about 470 nm, about 555 nm, about 650 nm) in the whole field may fall within about ±0.01 mm. Referring to FIG. 23(c), the focus variation with respect to the three different wavelengths (about 470 nm, about 555 nm, about 650 nm) in the whole field may fall within about ±0.05 mm. Referring to FIG. 23(d), the variation of the distortion aberration of the optical imaging lens 5 may be within about ±0.35%.

The values of T1, G12, T2, G23, T3, G34, T4, G45, T5, G5, TF, GFP, BFL, ALT, AAG,TTL,TL,EFL/ALT,EFL/BFL, TTL/BFL,TTL/ALT,ALT/(T1+T3+T4), (T2+G23+G34+G45+T5)/T1, (T2+G23+G34+G45+T5)/T3, (G12+T2+G45+T5)/T1, (G12+T2+G45+T5)/T3, (AAG+T5)/T1, (AAG+T5)/(T2+G23), (AAG+T2)/T4, (AAG+T2)/T5, AAG/T2, AAG/G23, AAG/T4 of this embodiment may be referred to FIG. 46.

In comparison with the first embodiment, the longitudinal spherical aberration may be smaller, the astigmatism aberrations in the sagittal direction and in the tangential direction may be smaller, the variation of the distortion aberration may be smaller, Fno may be the same. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 26:
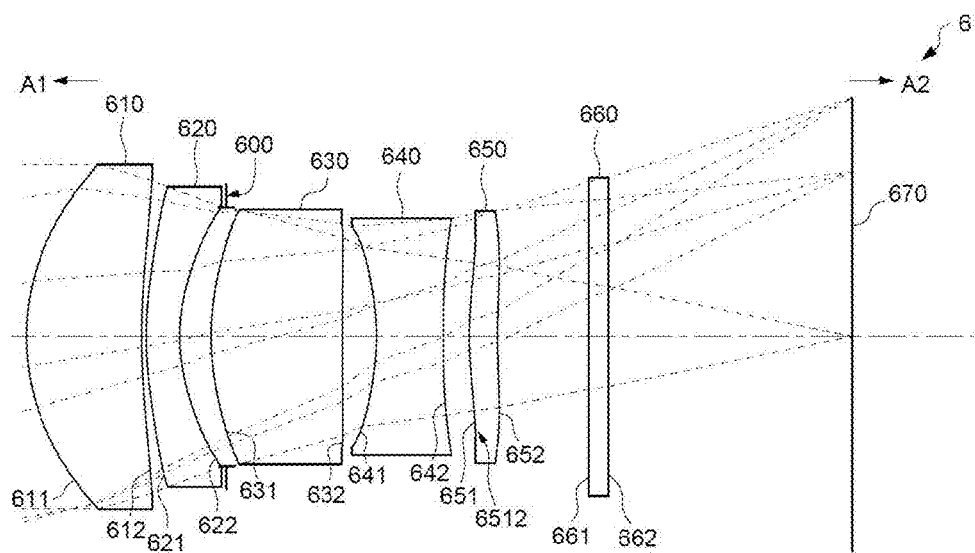
FIG. 26 depicts a cross-sectional view of a sixth embodiment of an optical imaging lens having seven lens elements according to the present disclosure.
Figure 27:
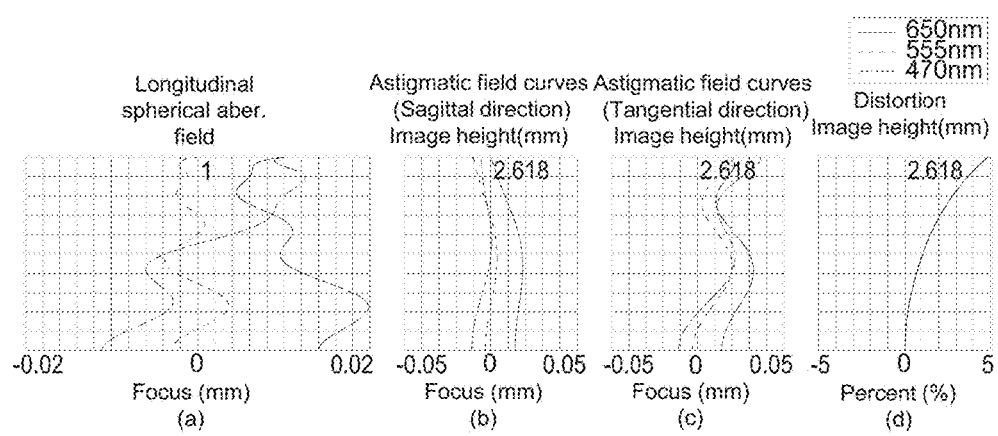
FIG. 27 depicts a chart of longitudinal spherical aberration and other kinds of optical aberrations of a sixth embodiment of the optical imaging lens according to the present disclosure.

Reference is now made to FIGS. 26-29. FIG. 26 illustrates an example cross-sectional view of an optical imaging lens 6 having five lens elements according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment may be similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical imaging lens 6 of the present embodiment, in an order from an object side A1 to an image side A2 along an optical axis, may comprise a first lens element 610, a second lens element 620, an aperture stop 600, a third lens element 630, a fourth lens element 640, and a fifth lens element 650.

The arrangements of the convex or concave surface structures, including the object-side surfaces 611, 621, 631, 641 and the image-side surfaces 612, 622, 632 642, 652 may be generally similar to the optical imaging lens 1, but the differences between the optical imaging lens 1 and the optical imaging lens 6 may include the convex or concave surface structures of the object-side surface 651 being different. Additional differences may include a radius of curvature, a thickness, aspherical data, and an effective focal length of each lens element. More specifically, the object-side surface 651 of the fifth lens element 650 may comprise a convex portion 6512 in a vicinity of a periphery of the fifth lens element 650.

Here, in the interest of clearly showing the drawings of a particular embodiment, only the surface shapes which may be different from that in the first embodiment are labeled. Please refer to FIG. 28 for the optical characteristics of each lens elements in the optical imaging lens 6 of the present embodiment.

From the vertical deviation of each curve shown in FIG. 27(a), the offset of the off-axis light relative to the image point may be within about ±0.02 mm. Referring to FIG. 27(b), the focus variation with respect to the three different wavelengths (about 470 nm, about 555 nm, about 650 nm) in the whole field may fall within about ±0.25 mm. Referring to FIG. 23(c), the focus variation with respect to the three different wavelengths (about 470 nm, about 555 nm, about 650 nm) in the whole field may fall within about ±0.35 mm. Referring to FIG. 27(d), the variation of the distortion aberration of the optical imaging lens 6 may be within about ±5%.

The values of T1, G12, T2, G23, T3, G34, T4, G45, T5, G5, TF, GFP, BFL, ALT, AAG,TTL,TL,EFL/ALT,EFL/BFL, TTL/BFL,TTL/ALT,ALT/(T1+T3+T4), (T2+G23+G34+G45+T5)/T1, (T2+G23+G34+G45+T5)/T3, (G12+T2+G45+T5)/T1, (G12+T2+G45+T5)/T3, (AAG+T5)/T1, (AAG+T5)/(T2+G23), (AAG+T2)/T4, (AAG+T2)/T5, AAG/T2, AAG/G23, AAG/T4 of this embodiment may be referred to FIG. 46.

In comparison with the first embodiment, the longitudinal spherical aberration may be smaller, the astigmatism aberration in the tangential direction may be smaller, the variation of the distortion aberration may be smaller, Fno may be the same but TTL may be smaller. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 30:
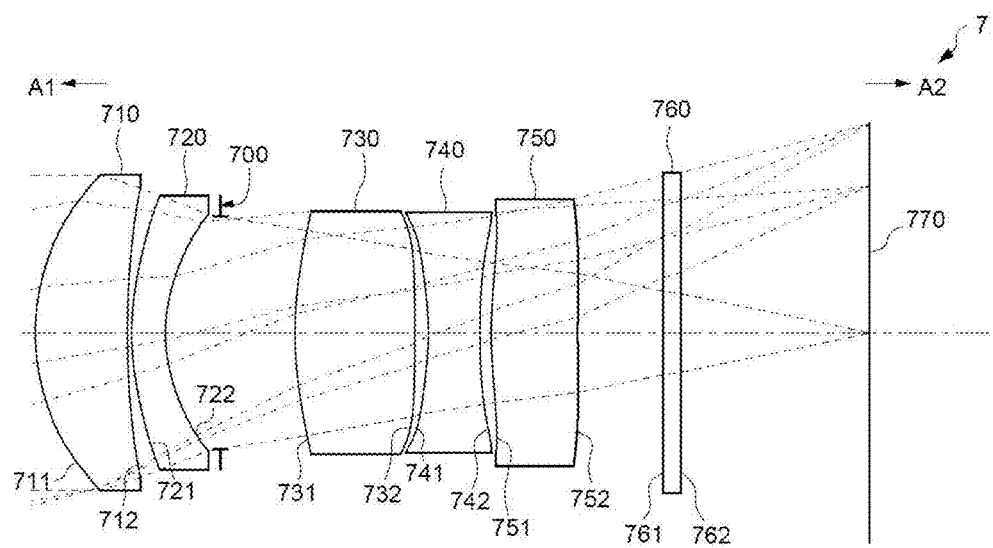
FIG. 30 depicts a cross-sectional view of a seventh embodiment of an optical imaging lens having seven lens elements according to the present disclosure.
Figure 31:
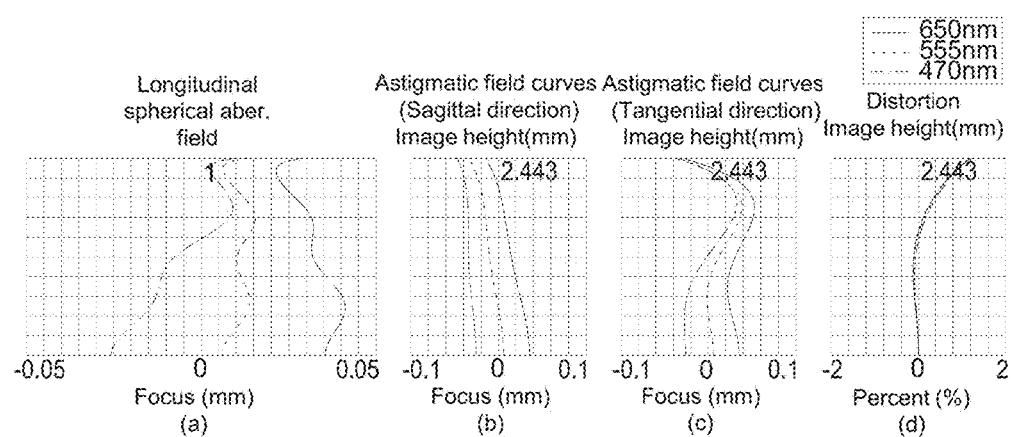
FIG. 31 depicts a chart of longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having five lens elements according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment may be similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical imaging lens 7 of the present embodiment, in an order from an object side A1 to an image side A2 along an optical axis, may comprise a first lens element 710, a second lens element 720, an aperture stop 700, a third lens element 730, fourth lens element 740, and a fifth lens element 750.

The arrangements of the convex or concave surface structures, including the object-side surfaces 711, 721, 731, 741, 751 and the image-side surfaces 712, 722, 732, 742, 752 may be generally similar to the optical imaging lens 1, but additional differences may include a radius of curvature, a thickness, aspherical data, and an effective focal length of each lens element being different.

Here, in the interest of clearly showing the drawings of a particular embodiment, only the surface shapes which may be different from that in the first embodiment are labeled. Please refer to FIG. 32 for the optical characteristics of each lens elements in the optical imaging lens 7 of the present embodiment.

From the vertical deviation of each curve shown in FIG. 31(a), the offset of the off-axis light relative to the image point may be within about ±0.045 mm. Referring to FIG. 31(b), the focus variation with respect to the three different wavelengths (about 470 nm, about 555 nm, about 650 nm) in the whole field may fall within about ±0.06 mm. Referring to FIG. 31(c), the focus variation with respect to the three different wavelengths (about 470 nm, about 555 nm, about 650 nm) in the whole field may fall within about ±0.04 mm. Referring to FIG. 31(d), the variation of the distortion aberration of the optical imaging lens 7 may be within about ±1.2%.

The values of T1, G12, T2, G23, T3, G34, T4, G45, T5, G5, TF, GFP, BFL, ALT, AAG,TTL,TL,EFL/ALT,EFL/BFL, TTL/BFL,TTL/ALT,ALT/(T1+T3+T4), (T2+G23+G34+ G45+T5)/T1, (T2+G23+G34+G45+T5)/T3, (G12+T2+ G45+T5)/T1, (G12+T2+G45+T5)/T3, (AAG+T5)/T1, (AAG+T5)/(T2+G23), (AAG+T2)/T4, (AAG+T2)/T5, AAG/T2, AAG/G23, AAG/T4 of this embodiment may be referred to FIG. 46.

In comparison with the first embodiment, the longitudinal spherical aberration may be smaller, the astigmatism aberration in the tangential direction may be smaller, the variation of the distortion aberration may be smaller, and Fno may be the same. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 34:
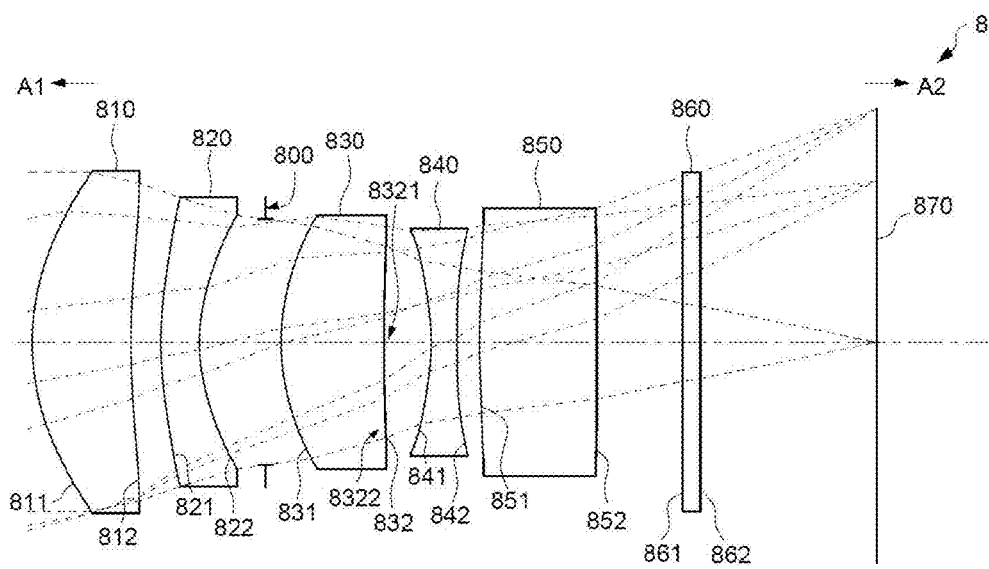
FIG. 34 depicts a cross-sectional view of an eighth embodiment of an optical imaging lens having seven lens elements according to the present disclosure.
Figure 35:
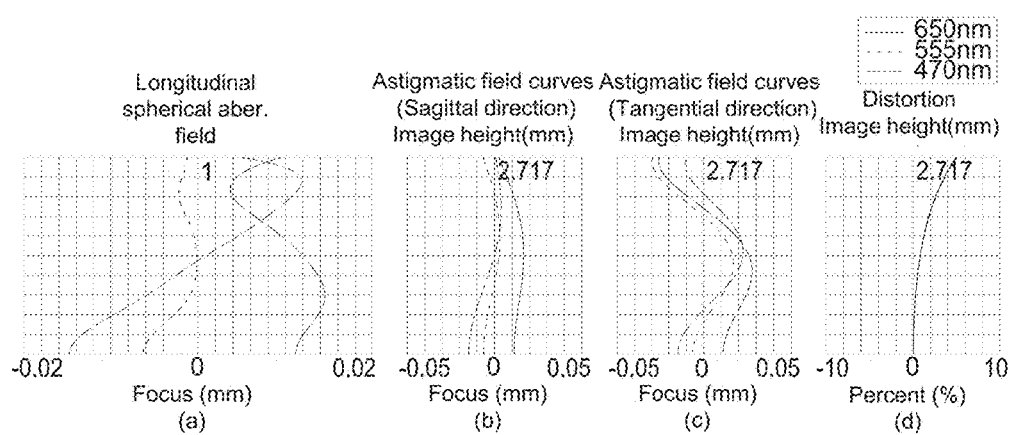
FIG. 35 depicts a chart of longitudinal spherical aberration and other kinds of optical aberrations of an eighth embodiment of the optical imaging lens according to the present disclosure.

Reference is now made to FIGS. 34-37. FIG. 34 illustrates an example cross-sectional view of an optical imaging lens 8 having five lens elements according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment may be similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical imaging lens 8 of the present embodiment, in an order from an object side A1 to an image side A2 along an optical axis, may comprise a first lens element 810, a second lens element 820, an aperture stop 800, a third lens element 830, a fourth lens element 840, and a fifth lens element 850.

The arrangements of the convex or concave surface structures, including the object-side surfaces 811, 821, 831, 841, 851 and the image-side surfaces 812, 822, 842, and 852 may be generally similar to the optical imaging lens 1, but the differences between the optical imaging lens 1 and the optical imaging lens 8 may include the convex or concave surface structures of the image-side surface 832 being different. Additional differences may include a radius of curvature, a thickness, aspherical data, and an effective focal length of each lens element. More specifically, the image-side surface 832 of the third lens element 830 may comprise a concave portion 8321 in a vicinity of the optical axis and a concave portion 8322 in a vicinity of a periphery of the third lens element 830.

Here, in the interest of clearly showing the drawings of a particular embodiment, only the surface shapes which may be different from that in the first embodiment are labeled. Please refer to FIG. 36 for the optical characteristics of each lens elements in the optical imaging lens 8 of the present embodiment.

From the vertical deviation of each curve shown in FIG. 35(a), the offset of the off-axis light relative to the image point may be within about ±0.016 mm. Referring to FIG. 35(b), the focus variation with respect to the three different wavelengths (about 470 nm, about 555 nm, about 650 nm) in the whole field may fall within about ±0.02 mm. Referring to FIG. 35(c), the focus variation with respect to the three different wavelengths (about 470 nm, about 555 nm, about 650 nm) in the whole field may fall within about ±0.03 mm.

Referring to FIG. 35(d), the variation of the distortion aberration of the optical imaging lens 8 may be within about ±6%.

The values of T1, G12, T2, G23, T3, G34, T4, G45, T5, G5, TF, GFP, BFL, ALT, AAG,TTL,TL,EFL/ALT,EFL/BFL, TTL/BFL,TTL/ALT,ALT/(T1+T3+T4), (T2+G23+G34+ G45+T5)/T1, (T2+G23+G34+G45+T5)/T3, (G12+T2+ G45+T5)/T1, (G12+T2+G45+T5)/T3, (AAG+T5)/T1, (AAG+T5)/(T2+G23), (AAG+T2)/T4, (AAG+T2)/T5, AAG/T2, AAG/G23, AAG/T4 of this embodiment may be referred to FIG. 46.

In comparison with the first embodiment, the longitudinal spherical aberration may be smaller, the astigmatism aberrations in the sagittal direction and in the tangential direction may be smaller, the variation of the distortion aberration may be smaller, and Fno may be the same. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 38:
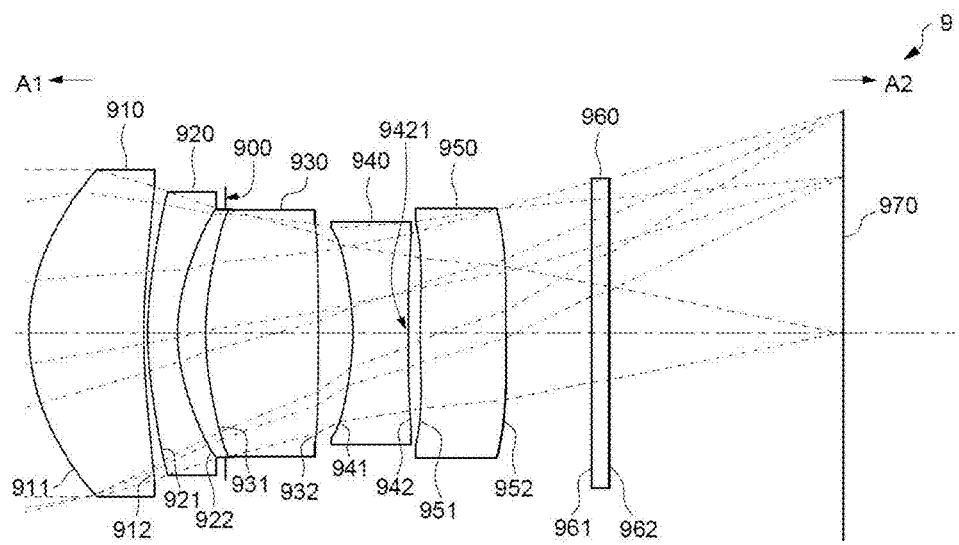
FIG. 38 depicts a cross-sectional view of a ninth embodiment of an optical imaging lens having seven lens elements according to the present disclosure.
Figure 39:
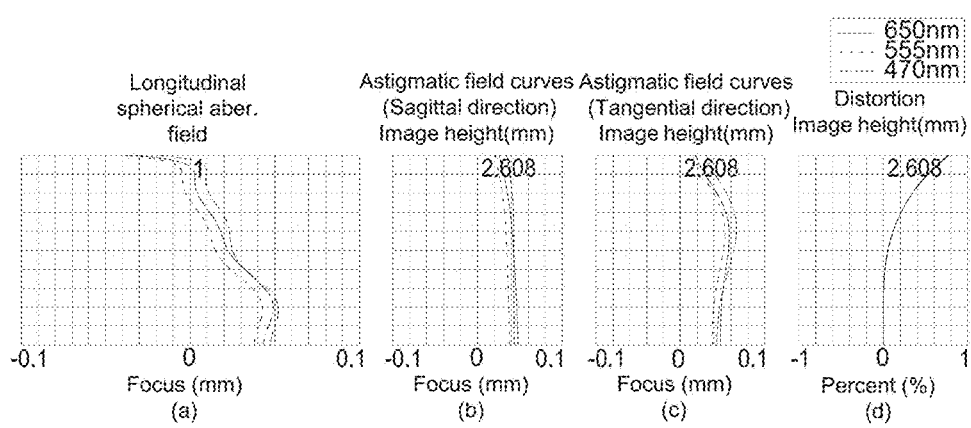
FIG. 39 depicts a chart of longitudinal spherical aberration and other kinds of optical aberrations of a ninth embodiment of the optical imaging lens according to the present disclosure.

Reference is now made to FIGS. 38-41. FIG. 38 illustrates an example cross-sectional view of an optical imaging lens 9 having five lens elements according to a ninth example embodiment. FIG. 39 shows example charts of longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment. The reference numbers labeled in the present embodiment may be similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 38, the optical imaging lens 9 of the present embodiment, in an order from an object side A1 to an image side A2 along an optical axis, may comprise a first lens element 910, a second lens element 920, an aperture stop 900, a third lens element 930, a fourth lens element 940, and a fifth lens element 950.

The arrangements of the convex or concave surface structures, including the object-side surfaces 911, 921, 931, 941, 951 and the image-side surfaces 912, 922, 932, 952 may be generally similar to the optical imaging lens 1, but the differences between the optical imaging lens 1 and the optical imaging lens 9 may include the convex or concave surface structures of the image-side surface 942 being different. Additional differences may include a radius of curvature, a thickness, aspherical data, and an effective focal length of each lens element. More specifically, the image-side surface 942 of the fourth lens element 940 may comprise a convex portion 9421 in a vicinity of the optical axis.

Here, in the interest of clearly showing the drawings of a particular embodiment, only the surface shapes which may be different from that in the first embodiment are labeled. Please refer to FIG. 40 for the optical characteristics of each lens elements in the optical imaging lens 9 of the present embodiment.

From the vertical deviation of each curve shown in FIG. 39(a), the offset of the off-axis light relative to the image point may be within about ±0.06 mm. Referring to FIG. 39(b), the focus variation with respect to the three different wavelengths (about 470 nm, about 555 nm, about 650 nm) in the whole field may fall within about ±0.08 mm. Referring to FIG. 39(c), the focus variation with respect to the three different wavelengths (about 470 nm, about 555 nm, about 650 nm) in the whole field may fall within about ±0.06 mm. Referring to FIG. 39(d), the variation of the distortion aberration of the optical imaging lens 9 may be within about ±0.8%.

The values of T1, G12, T2, G23, T3, G34, T4, G45, T5, G5, TF, GFP, BFL, ALT, AAG,TTL,TL,EFL/ALT,EFL/BFL, TTL/BFL,TTL/ALT,ALT/(T1+T3+T4), (T2+G23+G34+ G45+T5)/T1, (T2+G23+G34+G45+T5)/T3, (G12+T2+ G45+T5)/T1, (G12+T2+G45+T5)/T3, (AAG+T5)/T1, (AAG+T5)/(T2+G23), (AAG+T2)/T4, (AAG+T2)/T5, AAG/T2, AAG/G23, AAG/T4 of this embodiment may be referred to FIG. 46.

In comparison with the first embodiment, the longitudinal spherical aberration may be smaller, the astigmatism aberrations in the sagittal direction and in the tangential direction may be smaller, the variation of the distortion aberration may be smaller, and Fno may be the same. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

Figure 42:
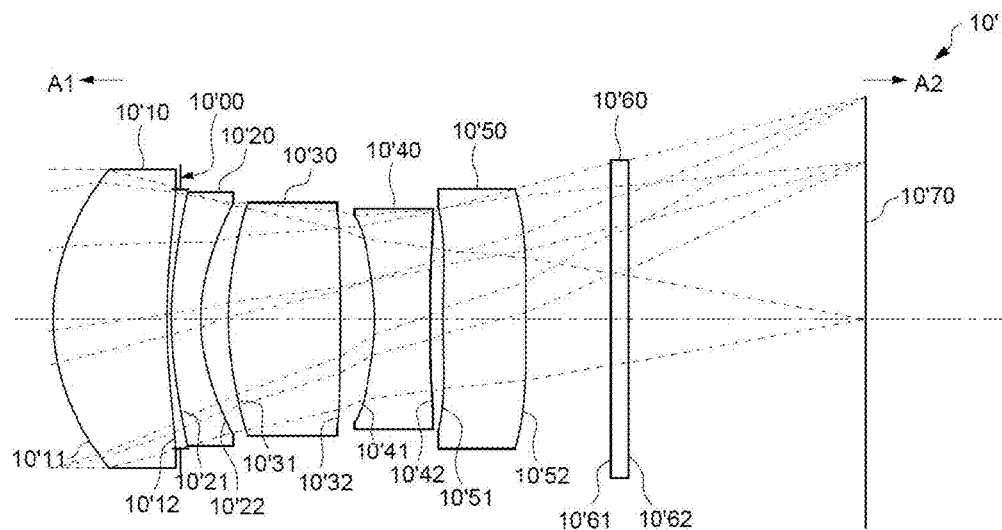
FIG. 42 depicts a cross-sectional view of a tenth embodiment of an optical imaging lens having seven lens elements according to the present disclosure.
Figure 43:
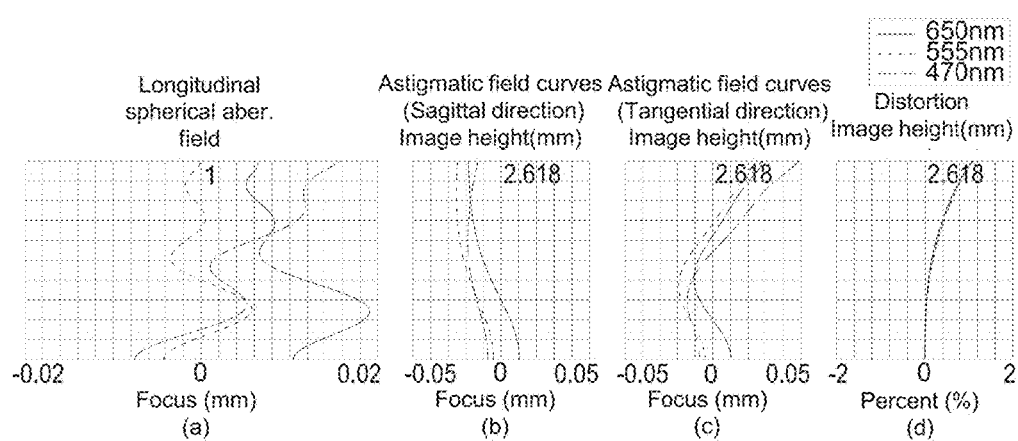
FIG. 43 depicts a chart of longitudinal spherical aberration and other kinds of optical aberrations of a tenth embodiment of the optical imaging lens according to the present disclosure.

Reference is now made to FIGS. 42-45. FIG. 42 illustrates an example cross-sectional view of an optical imaging lens 10' having five lens elements according to a tenth example embodiment. FIG. 43 shows example charts of longitudinal spherical aberration and other kinds of optical aberrations of the optical imaging lens 10' according to the tenth embodiment. FIG. 44 shows an example table of optical data of each lens element of the optical imaging lens 10' according to the tenth example embodiment. FIG. 45 shows an example table of aspherical data of the optical imaging lens 10' according to the tenth example embodiment. The reference numbers labeled in the present embodiment are similar to those in the first embodiment for the similar elements, but here the reference numbers are initialed with 10', for example, reference number 10'31 for labeling the object-side surface of the third lens element 10'30, reference number 10'32 for labeling the image-side surface of the third lens element 10'30, etc.

As shown in FIG. 42, the optical imaging lens 10' of the present embodiment, in an order from an object side A1 to an image side A2 along an optical axis, may comprise a first lens element 10'10, an aperture stop 10'00, a second lens element 10'20, a third lens element 10'30, a fourth lens element 10'40, and a fifth lens element 10'50.

The arrangements of the convex or concave surface structures, including the object-side surfaces 10'11, 10'21, 10'31, 10'41, 10'51 and the image-side surfaces 10'12, 10'22, 10'32, 10'42, 10'52 may be generally similar to the optical imaging lens 1, but the differences between the optical imaging lens 1 and the optical imaging lens 10 may include the location of the aperture stop 10'00 being different. Additional differences may include a radius of curvature, a thickness, aspherical data, and an effective focal length of each lens element.

Here, in the interest of clearly showing the drawings of a particular embodiment, only the surface shapes which may be different from that in the first embodiment are labeled. Please refer to FIG. 44 for the optical characteristics of each lens elements in the optical imaging lens 10' of the present embodiment.

From the vertical deviation of each curve shown in FIG. 43(a), the offset of the off-axis light relative to the image point may be within about ±0.02 mm. Referring to FIG. 43(b), the focus variation with respect to the three different wavelengths (about 470 nm, about 555 nm, about 650 nm) in the whole field may fall within about ±0.03 mm. Referring to FIG. 43(c), the focus variation with respect to the three different wavelengths (about 470 nm, about 555 nm, about 650 nm) in the whole field may fall within about ±0.05 mm. Referring to FIG. 43(d), the variation of the distortion aberration of the optical imaging lens 10' may be within about ±1.2%.

The values of T1, G12, T2, G23, T3, G34, T4, G45, T5, G5, TF, GFP, BFL, ALT, AAG,TTL,TL,EFL/ALT,EFL/BFL, TTL/BFL,TTL/ALT,ALT/(T1+T3+T4), (T2+G23+G34+ G45+T5)/T1, (T2+G23+G34+G45+T5)/T3, (G12+T2+ G45+T5)/T1, (G12+T2+G45+T5)/T3, (AAG+T5)/T1, (AAG+T5)/(T2+G23), (AAG+T2)/T4, (AAG+T2)/T5, AAG/T2, AAG/G23, AAG/T4 of this embodiment may be referred to FIG. 46.

In comparison with the first embodiment, the longitudinal spherical aberration may be smaller, the astigmatism aberrations in the sagittal direction and in the tangential direction may be smaller, the variation of the distortion aberration may be smaller, Fno may be bigger but is still smaller than 2.6. Further, the difference between the thickness in a vicinity of the optical axis and the thickness in a vicinity of a periphery region may be smaller when compared to the first embodiment, so that this embodiment may be manufactured more easily and the yield rate may be higher when compared to the first embodiment.

The values of T1, G12, T2, G23, T3, G34, T4, G45, T5, G5, TF, GFP, BFL, ALT, AAG,TTL,TL,EFL/ALT,EFL/BFL, TTL/BFL,TTL/ALT,ALT/(T1+T3+T4), (T2+G23+G34+ G45+T5)/T1, (T2+G23+G34+G45+T5)/T3, (G12+T2+ G45+T5)/T1, (G12+T2+G45+T5)/T3, (AAG+T5)/T1, (AAG+T5)/(T2+G23), (AAG+T2)/T4, (AAG+T2)/T5, AAG/T2, AAG/G23, AAG/T4 of all embodiment may be referred to FIG. 46, and it is clear that the optical imaging lens of any one of the ten embodiments may satisfy the Inequalities (1) to (17).

The first lens element having positive refracting power may assist in converging lights. The image-side surface of the first lens element having a concave portion in a vicinity of the optical axis and a concave portion in a vicinity of a periphery region of the first lens element may assist in matching with the object-side surface of the second lens element having a convex portion in a vicinity of a periphery region of the second lens element for decreasing the longitudinal spherical aberration. Moreover, the longitudinal spherical aberration may be smaller if the object-side surface of the second lens element comprises a convex portion in a vicinity of the optical axis. The object-side surface of the third lens element having a convex portion in a vicinity of the periphery region of the third lens element or having positive refracting power may assist in decreasing the aberration caused by the first and second lens elements, and the aberration may be smaller if the image-side surface of the third lens element comprises a convex portion in a vicinity of a periphery region of the third lens element. The image-side surface of the fourth lens element having a concave portion in a vicinity of a periphery region of the fourth lens element may assist in decreasing the aberration caused by the third lens element, and the aberration may be smaller if the fourth lens element has negative refracting power. The image-side surface of the fifth lens element having a convex portion in a periphery region of the fifth lens element may assist in decreasing the aberration caused by the fourth lens element. The object-side surface and image-side surface of the fifth lens element being aspherical surfaces may assist in decreasing the aberration of the optical imaging lens.

The effective radius of each lens element may be smaller or equal to about 2.5 mm, and the focal length of the optical imaging lens may be between about 8 mm and about 13.5 mm. In some embodiments, the effective radius may be smaller or equal to about 2 mm and the focal length may be between about 9 mm and about 13.5 mm. Such ranges may be advantageous to increase the focal length while conforming to a smaller lens volume of a mobile electrical device.

As a result of the aperture stop being located between the first lens element and the third lens element, the effective radius of each lens element may not be increased beyond about 2.5 mm and the focal length may be maintained between about 8 mm and about 13.5 mm when Fno is decreased. In some embodiments, the aperture stop may advantageously be located between the second lens element and the third lens element. In such embodiments, Fno may be smaller than about 2.4, the effective radius may be smaller or equal to about 2 mm and the focal length may be between about 9 mm and about 13.5 mm.

When v5≤35.00, the chromatic aberration caused by the fourth lens element and the chromatic aberration of the optical imaging lens can be regulated. An advantageous range of the Abbe number of the fifth lens element may be between about 18 and about 35.

When the value of any one of optical parameters is too big, it may not be advantageous to revise the aberration of the optical imaging lens. When the value of any one of optical parameters is too small, it may be difficult to manufacture the optical imaging lens. For maintaining appropriate values of the focal length and other optical parameters, the optical imaging lens may satisfy any one of inequalities as follows:

EFL/ALT≤2.4, and a more advantageous range is "1.5≤EFL/ALT≤2.4"; and

EFL/BFL≤4.2, and a more advantageous range is "1.8≤EFL/BFL≤4.2."

When the value of any one of optical parameters is too big, it may not be advantageous to decrease the volume of the optical imaging lens. When the value of any one of optical parameters is too small, it may be difficult to manufacture the optical imaging lens. For maintaining appropriate values of the thickness of each lens element and the gap, the optical imaging lens may satisfy any one of inequalities as follows:

TTL/BFL≤3.61, and a more advantageous range is "1.45≤TTL/BFL≤3.61";

TTL/ALT≤2.21, and a more advantageous range is "1.2≤TTL/ALT≤2.21;"

ALT/($T1+T3+T4$)≤1.8, and a more advantageous range is "0.8≤ALT/($T1+T3+T4$)≤1.8;"

($T2+G23+G34+G45+T5$)/$T1$≤3.3, and a more advantageous range is

"1.2≤($T2+G23+G34+G45+T5$)/$T1$≤3.3;"

($T2+G23+G34+G45+T5$)/$T3$≤6, and a more advantageous range is

"1≤($T2+G23+G34+G45+T5$)/$T3$≤6;"

(G12+T2+G45+T5)/T1≤2.2, and a more advantageous range is

"0.7≤(G12+T2+G45+T5)/T1≤2.2;"

(G12+T2+G45+T5)/T3≤4.1, and a more advantageous range is

"0.69≤(G12+T2+G45+T5)/T3≤4.1;"

(AAG+T5)/T1≤3.01, and a more advantageous range is "1≤(AAG+T5)/T1≤3.01;"

(AAG+T5)/(T2+G23)≤4.2, and a more advantageous range is

"1.49≤(AAG+T5)/(T2+G23)≤4.2;"

(AAG+T2)/T4≤8.51, and a more advantageous range is "1.4≤(AAG+T2)/T4≤8.51;"

(AAG+T2)/T5≤4.6, and a more advantageous range is "0.79≤(AAG+T2)/T5≤4.6;"

AAG/T2≤4.71, and a more advantageous range is "1.94≤AAG/T2≤4.71;"

AAG/G23≤4, and a more advantageous range is "1.1≤AAG/G23≤4;" and

AAG/T4≤7.2, and a more advantageous range is "0.99≤AAG/T4≤7.2."

Moreover, the optical parameters according to one embodiment may be selectively incorporated in other embodiments to limit and enhance the structure of the optical imaging lens. In consideration of the non-predictability of the optical imaging lens, while the optical imaging lens may satisfy any one of inequalities described above, the optical imaging lens herein may advantageously achieve a shortened length, provide an enlarged aperture stop, increase an imaging quality and/or assembly yield, and/or effectively improve drawbacks of a typical optical imaging lens.

Any one of the aforementioned inequalities may be selectively incorporated in other inequalities to apply to the present embodiments, and as such are not limiting. Embodiments according to the present disclosure are not limiting and may be selectively incorporated in other embodiments described herein. In some embodiments, more details about the parameters may be incorporated to enhance the control for the system performance and/or resolution. For example, the object-side surface of the first lens element may comprise a convex portion in a vicinity of the optical axis. It is noted that the details listed here may be incorporated into example embodiments if no inconsistency occurs.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features may be provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, comprising first, second, third, fourth, and fifth lens elements as five frontmost lens elements having refracting power arranged sequentially in ascending order from an object side to an image side along an optical axis, each of the first, second, third, fourth, and fifth lens elements having an object-side surface facing toward the object side, an image-side surface facing toward the image side, wherein:
   the first lens element has positive refracting power;
   the object-side surface of the second lens element comprises a convex portion in a vicinity of a periphery of the second lens element;
   the object-side surface of the third lens element comprises a convex portion in a vicinity of a periphery of the third lens element;
   the image-side surface of the fourth lens element comprises a concave portion in a vicinity of a periphery of the fourth lens element;
   the object-side surface and the image-side surface of the fifth lens element are aspherical surfaces, and an effective radius of each of the first, second, third, fourth, and fifth lens elements is smaller or equal to about 2.5 mm and the focal length of the optical imaging lens is between about 8 mm and about 13.5 mm.

2. The optical imaging lens according to claim 1, wherein a sum of air gaps from the first to the fifth lens elements along the optical axis is represented by AAG, a central thickness of the second lens element along the optical axis is represented by T2, and the optical imaging lens further satisfies an inequality: AAG/T2≤4.71.

3. The optical imaging lens according to claim 1, wherein a sum of air gaps from the first to the fifth lens elements along the optical axis is represented by AAG, a central thickness of the first lens element along the optical axis is represented by T1, a central thickness of the fifth lens element along the optical axis is represented by T5, and the optical imaging lens further satisfies an inequality: (AAG+T5)/T1≤3.01.

4. The optical imaging lens according to claim 1, wherein a distance between the object-side surface of the first lens element and an image plane along the optical axis is represented by TTL, a distance from the image-side surface of the fifth lens element to an image plane along the optical axis is represented by BFL, and the optical imaging lens further satisfies an inequality: TTL/BFL≤3.61.

5. The optical imaging lens according to claim 1, wherein a distance between the object-side surface of the first lens element and an image plane along the optical axis is represented by TTL, a sum of central thicknesses from the first to the fifth lens elements along the optical axis is represented by ALT, and the optical imaging lens further satisfies an inequality: TTL/ALT≤2.21.

6. The optical imaging lens according to claim 1, wherein a sum of central thicknesses from the first to the fifth lens elements along the optical axis is represented by ALT, a central thickness of the first lens element along the optical axis is represented by T1, a central thickness of the third lens element along the optical axis is represented by T3, a central thickness of the fourth lens element along the optical axis is represented by T4, and the optical imaging lens further satisfies an inequality: ALT/(T1+T3+T4)≤1.8.

7. The optical imaging lens according to claim 1, wherein a central thickness of the first lens element along the optical axis is represented by T1, a central thickness of the second lens element along the optical axis is represented by T2, a central thickness of the fifth lens element along the optical axis is represented by T5, an air gap between the second lens element and the third lens element along the optical axis is represented by G23, an air gap between the third lens element and the fourth lens element along the optical axis is represented by G34, an air gap between the fourth lens element and the fifth lens element along the optical axis is represented by G45, and the optical imaging lens further satisfies an inequality: (T2+G23+G34+G45+T5)/T1≤3.3.

8. An optical imaging lens, comprising first, second, third, fourth, and fifth lens elements as five frontmost lens elements having refracting power arranged sequentially in ascending order from an object side to an image side along an optical axis, each of the first, second, third, fourth, and fifth lens elements having an object-side surface facing toward the object side, an image-side surface facing toward the image side, wherein:
  the first lens element has positive refracting power and the image-side surface of the first lens element comprises a concave portion in a vicinity of the optical axis and a concave portion in a vicinity of a periphery of the first lens element;
  the object-side surface of the second lens element comprises a convex portion in a vicinity of a periphery of the second lens element;
  the third lens element has positive refracting power and the object-side surface of the third lens element comprises a convex portion in a vicinity of a periphery of the third lens element;
  the image-side surface of the fourth lens element comprises a concave portion in a vicinity of a periphery of the fourth lens element;
  the object-side surface and the image-side surface of the fifth lens element are aspherical surfaces;
  the optical imaging lens further comprises an aperture stop located between the first lens element and the third lens element; and
  an effective radius of each of the first, second, third, fourth, and fifth lens elements is smaller or equal to about 2.5 mm.

9. The optical imaging lens according to claim 8, wherein a sum of air gaps from the first to the fifth lens elements along the optical axis is represented by AAG, an air gap between the second lens element and the third lens element along the optical axis is represented by G23, and the optical imaging lens further satisfies an inequality: AAG/G23≤4.

10. The optical imaging lens according to claim 8, wherein a sum of air gaps from the first to the fifth lens elements along the optical axis is represented by AAG, a central thickness of the second lens element along the optical axis is represented by T2, a central thickness of the fourth lens element along the optical axis is represented by T4, and the optical imaging lens further satisfies an inequality: (AAG+T2)/T4≤8.51.

11. The optical imaging lens according to claim 8, wherein an effective focal length of the optical imaging lens is represented by EFL, a distance from the image-side surface of the fifth lens element to an image plane along the optical axis is represented by BFL, and the optical imaging lens further satisfies an inequality: EFL/BFL≤4.2.

12. The optical imaging lens according to claim 8, wherein a central thickness of the first lens element along the optical axis is represented by T1, a central thickness of the second lens element along the optical axis is represented by T2, a central thickness of the fifth lens element along the optical axis is represented by T5, an air gap between the first lens element and the second lens element along the optical axis is represented by G12, an air gap between the fourth lens element and the fifth lens element along the optical axis is represented by G45, and the optical imaging lens further satisfies an inequality: (G12+T2+G45+T5)/T1≤2.2.

13. The optical imaging lens according to claim 8, wherein a sum of air gaps from the first to the fifth lens elements along the optical axis is represented by AAG, a central thickness of the second lens element along the optical axis is represented by T2, a central thickness of the fifth lens element along the optical axis is represented by T5, an air gap between the second lens element and the third lens element along the optical axis is represented by G23, and the optical imaging lens further satisfies an inequality: (AAG+T5)/(T2+G23)≤4.2.

14. The optical imaging lens according to claim 8, wherein a central thickness of the second lens element along the optical axis is represented by T2, a central thickness of the third lens element along the optical axis is represented by T3, a central thickness of the fifth lens element along the optical axis is represented by T5, an air gap between the second lens element and the third lens element along the optical axis is represented by G23, an air gap between the third lens element and the fourth lens element along the optical axis is represented by G34, an air gap between the fourth lens element and the fifth lens element along the optical axis is represented by G45, and the optical imaging lens further satisfies an inequality: (T2+G23+G34+G45+T5)/T3≤6.

15. An optical imaging lens, comprising first, second, third, fourth, and fifth lens elements as five frontmost lens elements having refracting power arranged sequentially in ascending order from an object side to an image side along an optical axis, each of the first, second, third, fourth, and fifth lens elements having an object-side surface facing toward the object side, an image-side surface facing toward the image side, wherein:
  the first lens element has positive refracting power and the image-side surface of the first lens element comprises a concave portion in a vicinity of the optical axis and a concave portion in a vicinity of a periphery of the first lens element;
  the object-side surface of the second lens element comprises a convex portion in a vicinity of the optical axis and a convex portion in a vicinity of a periphery of the second lens element;
  the object-side surface of the third lens element comprises a convex portion in a vicinity of a periphery of the third lens element;
  the image-side surface of the fourth lens element comprises a concave portion in a vicinity of a periphery of the fourth lens element;
  the object-side surface and the image-side surface of the fifth lens element are aspherical surfaces;

the optical imaging lens further comprises an aperture stop located between the first lens element and the third lens element; and an effective radius of each of the first, second, third, fourth, and fifth lens elements is smaller or equal to about 2.5 mm.

16. The optical imaging lens according to claim 15, wherein a sum of air gaps from the first to the fifth lens elements along the optical axis is represented by AAG, a central thickness of the fourth lens element along the optical axis is represented by T4, and the optical imaging lens further satisfies an inequality: $AAG/T4 \leq 7.2$.

17. The optical imaging lens according to claim 15, wherein a sum of air gaps from the first to the fifth lens elements along the optical axis is represented by AAG, a central thickness of the second lens element along the optical axis is represented by T2, a central thickness of the fifth lens element along the optical axis is represented by T5, and the optical imaging lens further satisfies an inequality: $(AAG+T2)/T5 \leq 4.6$.

18. The optical imaging lens according to claim 15, wherein an effective focal length of the optical imaging lens is represented by EFL, a sum of central thicknesses from the first to the fifth lens elements along the optical axis is represented by ALT, and the optical imaging lens further satisfies an inequality: $EFL/ALT \leq 2.4$.

19. The optical imaging lens according to claim 15, wherein an air gap between the first lens element and the second lens element along the optical axis is represented by G12, an air gap between the fourth lens element and the fifth lens element along the optical axis is represented by G45, a central thickness of the second lens element along the optical axis is represented by T2, a central thickness of the third lens element along the optical axis is represented by T3, a central thickness of the fifth lens element along the optical axis is represented by T5, and the optical imaging lens further satisfies an inequality: $(G12+T2+G45+T5)/T3 \leq 4.1$.

20. The optical imaging lens according to claim 15, wherein an abbe number of the fifth lens element is represented by v5, and the optical imaging lens further satisfies an inequality: $v5 \leq 35$.

* * * * *